US009491755B2

(12) United States Patent
Abu-Surra et al.

(10) Patent No.: US 9,491,755 B2
(45) Date of Patent: Nov. 8, 2016

(54) METHODS AND APPARATUS TO TRANSMIT AND RECEIVE SYNCHRONIZATION SIGNALS IN A MOBILE COMMUNICATION SYSTEM

(71) Applicant: Samsung Electronics Co., Ltd., Suwon-si, Gyeonggi-do (KR)

(72) Inventors: Shadi Abu-Surra, Richardson, TX (US); Sridhar Rajagopal, Plano, TX (US); Ying Li, Richardson, TX (US); Jaspreet Singh, Richardson, TX (US); Zhouyue Pi, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 701 days.

(21) Appl. No.: 13/652,279

(22) Filed: Oct. 15, 2012

(65) Prior Publication Data
US 2013/0235851 A1  Sep. 12, 2013

Related U.S. Application Data

(60) Provisional application No. 61/625,569, filed on Apr. 17, 2012, provisional application No. 61/609,202, filed on Mar. 9, 2012, provisional application No. 61/652,750, filed on May 29, 2012.

(51) Int. Cl.
*H04W 72/04* (2009.01)
*H04J 11/00* (2006.01)
(Continued)

(52) U.S. Cl.
CPC ........ *H04W 72/044* (2013.01); *H04J 11/0069* (2013.01); *H04W 56/00* (2013.01); *H04W 72/042* (2013.01); *H04B 7/0408* (2013.01); *H04B 7/0891* (2013.01)

(58) Field of Classification Search
CPC .......... H04J 11/0069–11/0093; H04B 7/0491; H04B 7/0495; H04B 7/0408; H04B 7/0891; H04W 56/00; H04W 72/04; H04W 72/042; H04W 72/044
USPC ......................................... 370/328, 350, 503
See application file for complete search history.

(56) References Cited

U.S. PATENT DOCUMENTS 6,233,466 B1   5/2001  Wong et al.
2002/0181633 A1  12/2002  Trans
(Continued)

FOREIGN PATENT DOCUMENTS

EP   1 515 454 A2   3/2005
EP   2 219 409 A1   8/2010
(Continued)

OTHER PUBLICATIONS

International Search Report dated Jun. 26, 2013 in connection with International Patent Application No. PCT/KR2013/001889, 3 pages.
(Continued)

*Primary Examiner* — Joshua Kading

(57) ABSTRACT

Beam-steered millimeter wave signals transmitted in each of n sector slices include a sequence of primary synchronization (PSCH) symbols within predetermined symbol positions in at least one slot of a subframe. The symbols in consecutive symbol positions are each transmitted on a different one of the n slices, with the first symbol repeated on the same slice at the end. The sequence order rotates cyclically in each subframe so that two PSCH symbols are transmitted on one slice in a single subframe every nth subframe. Secondary synchronization (SSCH) and Broadcast Channel (BCH) symbols are transmitted in a predetermined pattern following the sequence of PSCH symbols. By transmitting consecutive PSCH symbols on different slices and repeating the first symbol, the mobile station can detect the best slice and beam by switching receive beams every subframe instead of every slot, relaxing time constraints on AGC adjustment while avoiding the start-at-the-edge problem.

32 Claims, 21 Drawing Sheets

(51) Int. Cl.
*H04W 56/00* (2009.01)
*H04B 7/04* (2006.01)
*H04B 7/08* (2006.01)

(56) References Cited

U.S. PATENT DOCUMENTS

| | | | |
|---|---|---|---|
| 2007/0140106 A1* | 6/2007 | Tsai et al. | 370/208 |
| 2007/0248068 A1* | 10/2007 | Onggosanusi | H04J 11/0069 370/338 |
| 2008/0089282 A1* | 4/2008 | Malladi et al. | 370/329 |
| 2009/0086713 A1* | 4/2009 | Luo | 370/350 |
| 2009/0116565 A1* | 5/2009 | Ahn et al. | 375/260 |
| 2009/0296663 A1* | 12/2009 | Wild | 370/335 |
| 2011/0090860 A1 | 4/2011 | Ihm et al. | |
| 2011/0158116 A1* | 6/2011 | Tenny et al. | 370/252 |
| 2012/0051451 A1* | 3/2012 | Kwon et al. | 375/285 |
| 2012/0307726 A1* | 12/2012 | Pi et al. | 370/328 |

FOREIGN PATENT DOCUMENTS

| | | |
|---|---|---|
| WO | WO 2005/036917 A1 | 4/2005 |
| WO | WO 2006/077465 A1 | 7/2006 |
| WO | WO 2010/118260 A1 | 10/2010 |

OTHER PUBLICATIONS

International Written Opinion dated Jun. 26, 2013 in connection with International Patent Application No. PCT/KR2013/001889, 6 pages.

Extended European Search Report, dated Oct. 2, 2015, in connection with European Patent Application No. 13758320.9, 6 pages.

First Examination Report dated Sep. 15, 2015, in connection with India Patent Application No. 5564/CHENP/2009, 2 pages.

* cited by examiner

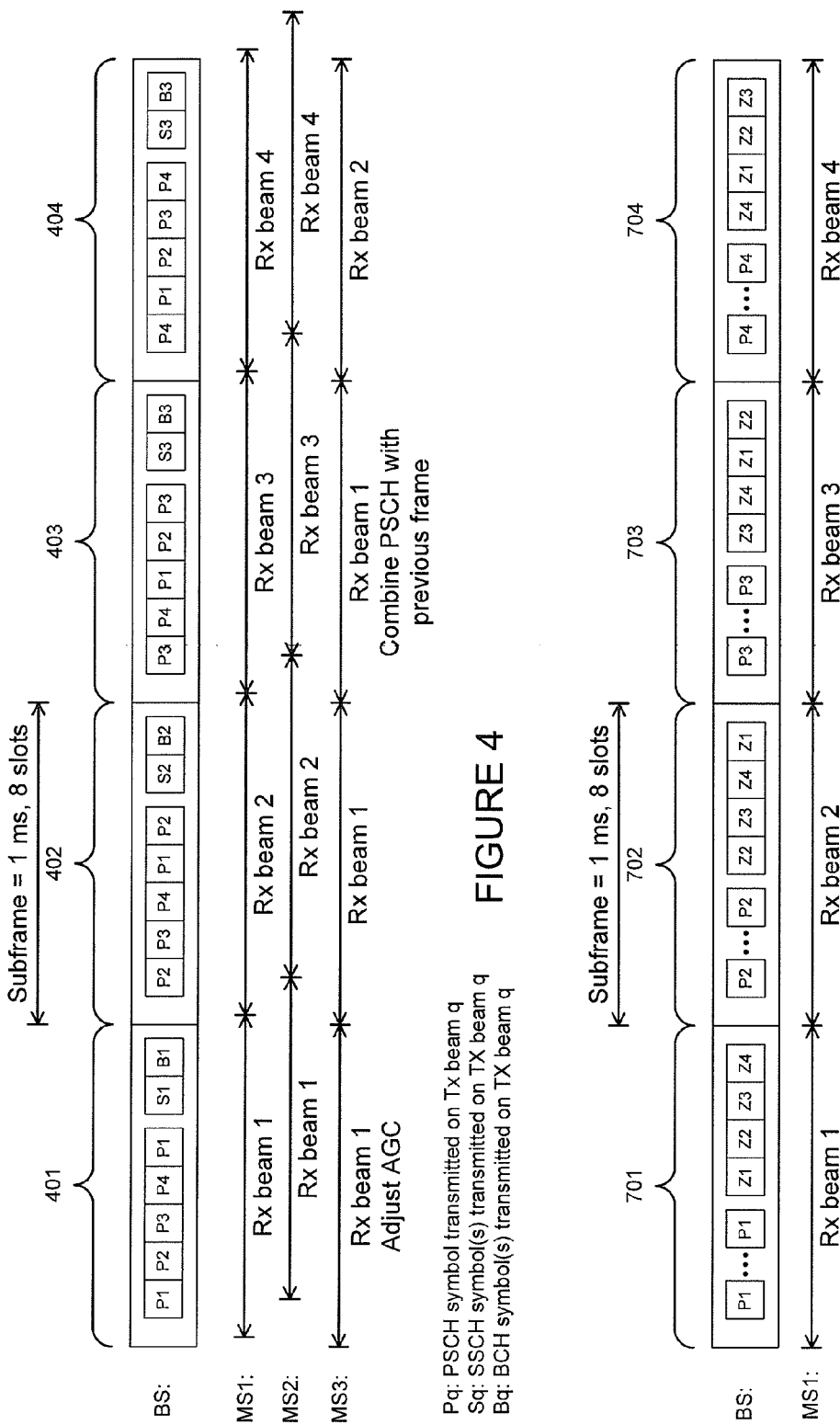

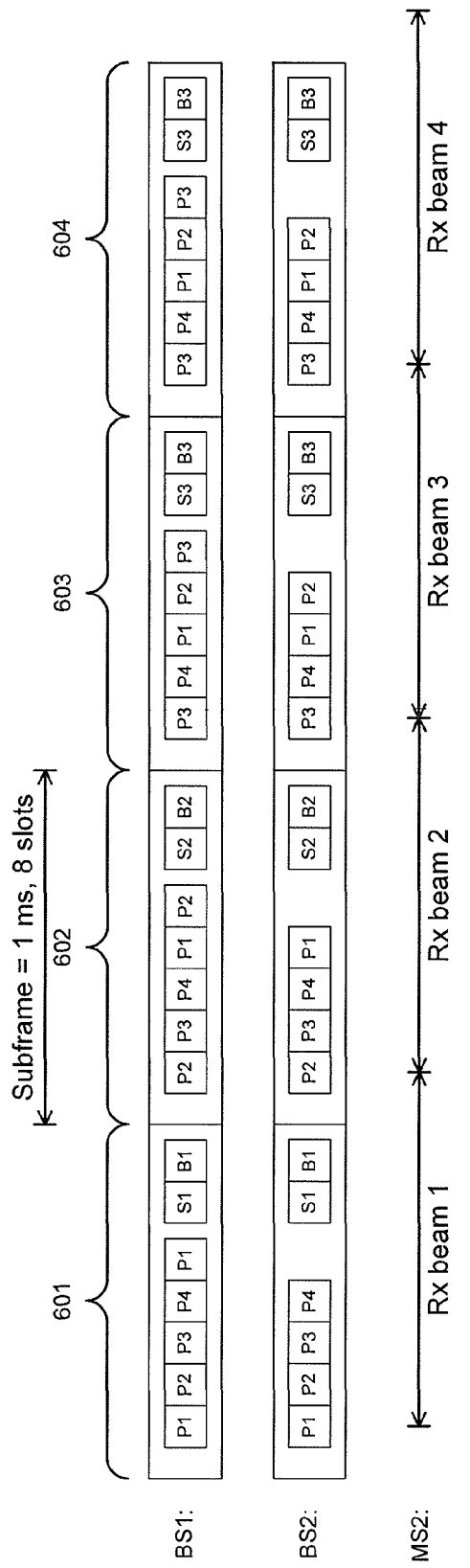

1100

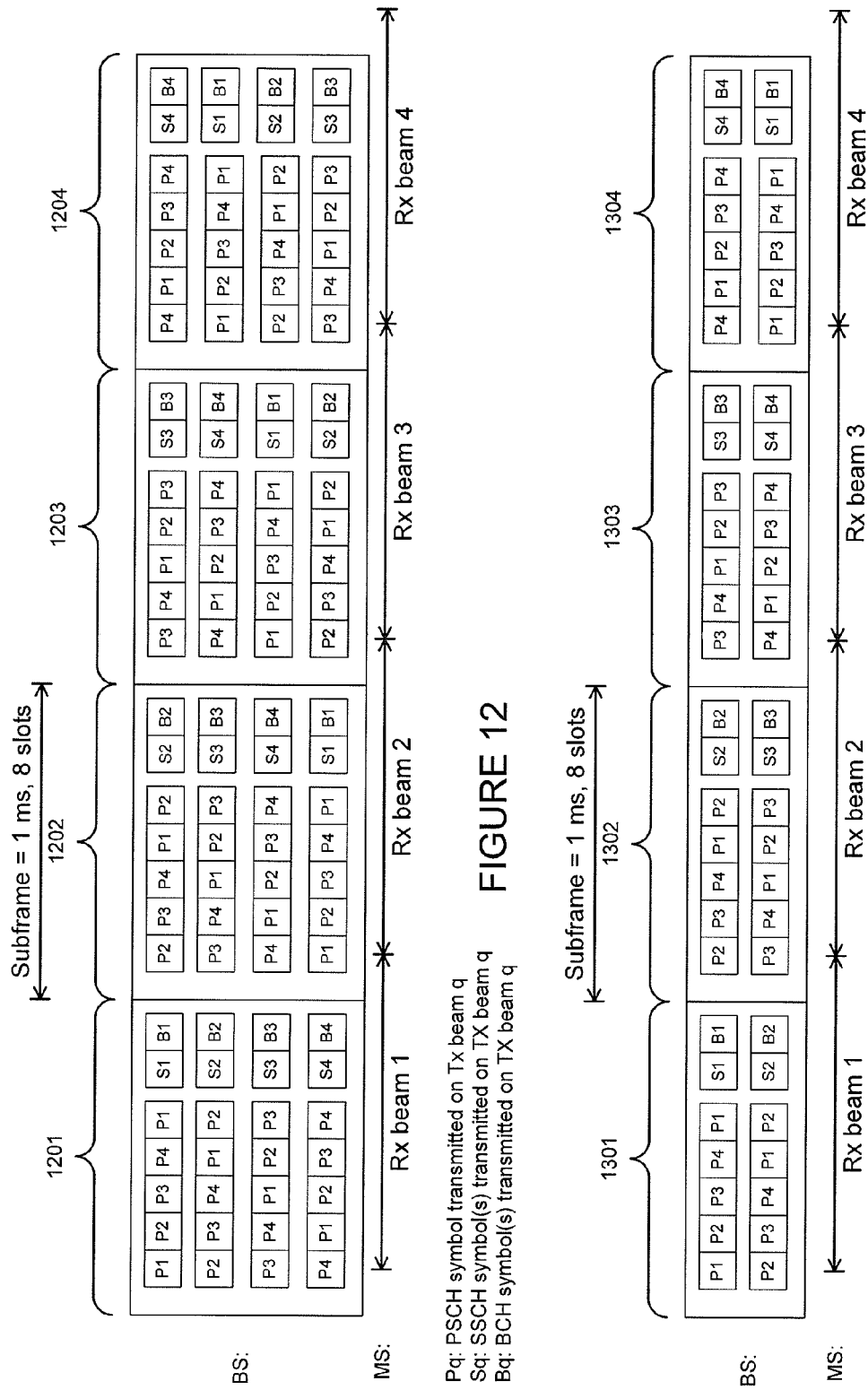

Pq: PSCH symbol transmitted on Tx beam q
Sq: SSCH symbol(s) transmitted on TX beam q
Bq: BCH symbol(s) transmitted on TX beam q

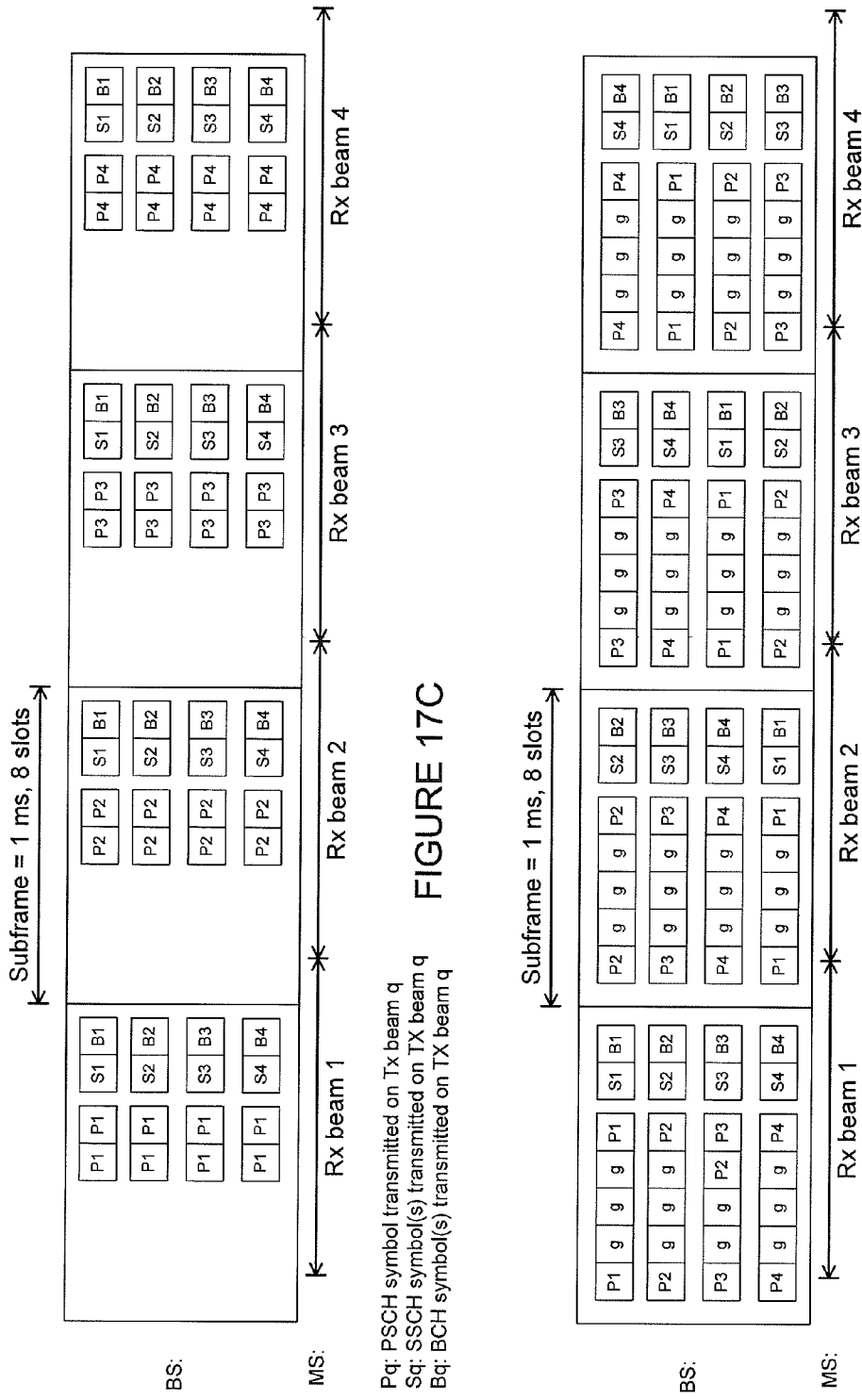

METHODS AND APPARATUS TO TRANSMIT AND RECEIVE SYNCHRONIZATION SIGNALS IN A MOBILE COMMUNICATION SYSTEM

This application hereby incorporates by reference U.S. Provisional Patent Application Ser. No. 61/625,569, filed Apr. 17, 2012, entitled "METHODS AND APPARATUS TO TRANSMIT AND RECEIVE SYNCHRONIZATION SIGNALS IN A MOBILE COMMUNICATION SYSTEM," U.S. Provisional Patent Application Ser. No. 61/609,202, filed Mar. 9, 2012, entitled "CELL SCANNING IN MILLIMETER WAVE COMMUNICATIONS," and U.S. Provisional Patent Application Ser. No. 61/652,750, filed May 29, 2012, entitled "METHODS AND APPARATUS TO TRANSMIT AND RECEIVE SYNCHRONIZATION SIGNAL IN A MOBILE COMMUNICATION SYSTEM WITH MULTIPLE RF CHAINS."

TECHNICAL FIELD

The present disclosure relates generally to synchronization signals in wireless mobile communication systems and, more specifically, to synchronization for millimeter wave mobile communication systems.

BACKGROUND

Synchronization signals serve important functions in wireless mobile communication. However, existing synchronization schemes generally impose tight constraints on mobile station synchronization algorithms, and introduce problems such as the starting-at-the-edge problem. Both issues present serious impediments to utilizing such synchronization schemes in contemplated millimeter wave mobile communication systems.

There is, therefore, a need in the art for improved synchronization for millimeter wave mobile communications.

SUMMARY

Beam-steered millimeter wave signals transmitted in each of n sector slices include a sequence of primary synchronization (PSCH) symbols within predetermined symbol positions in at least one slot of a subframe. The symbols in consecutive symbol positions are each transmitted on a different one of the n slices, with the first symbol repeated on the same slice at the end. The sequence order rotates cyclically in each subframe so that two PSCH symbols are transmitted on one slice in a single subframe every nth subframe. Secondary synchronization (SSCH) and Broadcast Channel (BCH) symbols are transmitted in a predetermined pattern following the sequence of PSCH symbols. By transmitting consecutive PSCH symbols on different slices and repeating the first symbol, the mobile station can detect the best slice and beam by switching receive beams every subframe instead of every slot, relaxing time constraints on AGC adjustment while avoiding the start-at-the-edge problem.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, where such a device, system or part may be implemented in hardware that is programmable by firmware or software. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 depicts rotation of synchronization symbols to different symbol positions within a slot across subframes in a frame for transmissions in a wireless network implementing synchronization according to embodiments of the present disclosure;

FIG. 6 illustrates avoiding start-at-the-edge problems for mobile station detection of synchronization symbols by duplication of a synchronization symbol within a slot for transmissions in a wireless network implementing synchronization according to embodiments of the present disclosure;

FIG. 7 depicts transmission of secondary synchronization and broadcast channel symbols on all slices in every subframe during transmissions in a wireless network implementing synchronization according to embodiments of the present disclosure;

FIGS. 12 and 13 depict rotation of synchronization symbols to different symbol positions across subframes in a frame for transmissions by a base station having multiple RF chains in a wireless network implementing synchronization according to embodiments of the present disclosure;

FIGS. 17A-17D depict SCH/BCH schemes with variable PSCH regions for a BS using different numbers of RF chains in a wireless network implementing synchronization according to embodiments of the present disclosure.

DETAILED DESCRIPTION

Figure 1:
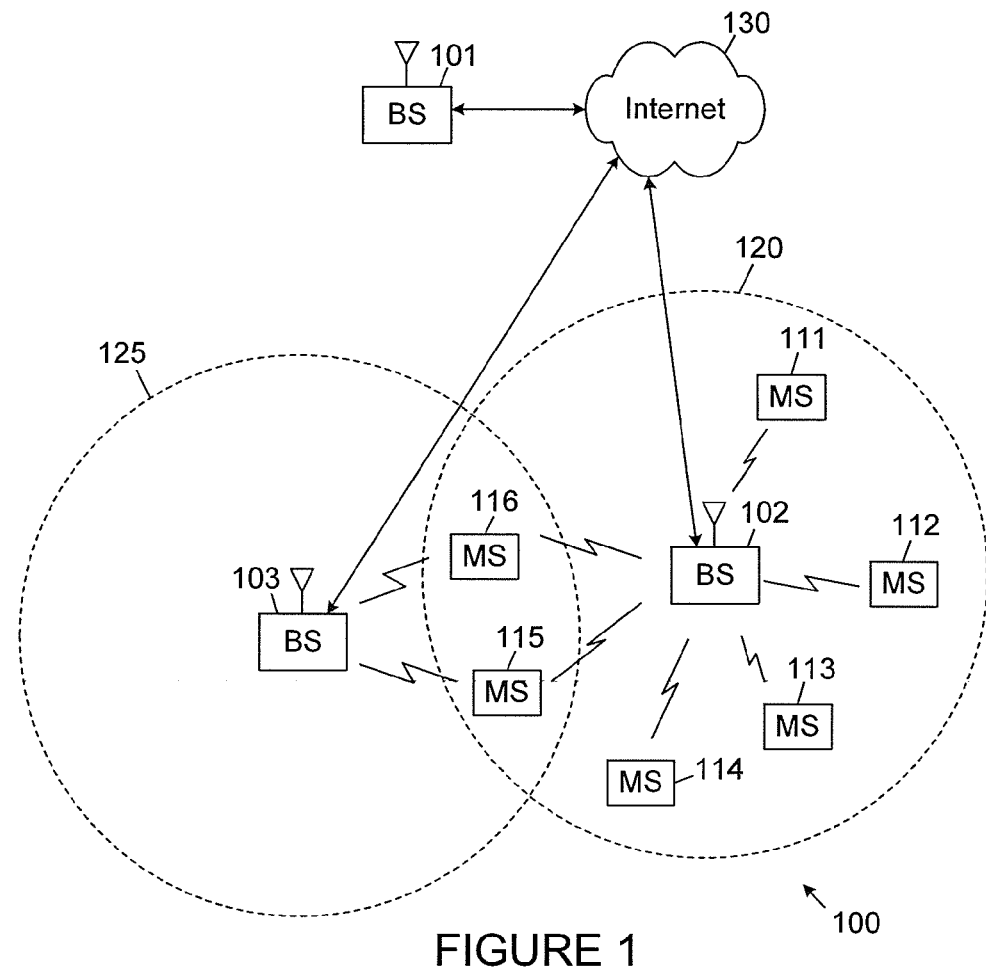
FIG. 1 is a high level diagram illustrating an exemplary wireless network implementing estimation of channel time and frequency correlations according to one or more embodiments of the present disclosure.

FIGS. 1 through 17D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Mobile communication has been one of the most successful innovations in modern history. In recent years, the number of subscribers to mobile communication services has exceeded five (5) billion and is growing fast. At the same time, new mobile communication technologies have been developed to satisfy the increasing demand and to provide more and better mobile communication applications and services. Some examples of such mobile communication systems are Code Division Multiple Access International Mobile Telecommunications 2000 Evolution-Data Optimized (CDMA2000 1xEV-DO) systems developed by the Third Generation Partnership Project 2 (3GPP2), the Wideband-Code Division Multiple Access (WCDMA), High Speed Packet Access (HSPA), and Long Term Evolution (LTE) systems developed by the Third Generation Partnership Project (3GPP), and mobile Worldwide Interoperability for Microwave Access (WiMAX) systems developed by the Institute for Electrical and Electronic Engineers (IEEE). As more and more people become users of mobile communication systems, and more and more services are provided over these systems, there is an increasing need of a mobile communication system with larger capacity, higher throughput, lower latency, and better reliability.

Millimeter (mm) waves refer to radio waves with wavelength in the range of 1 mm to 10 mm, which corresponds to radio frequencies of 30 gigaHertz (GHz) to 300 GHz. These radio waves exhibit unique propagation characteristics. For example, compared with lower frequency radio waves, these radio waves suffer higher propagation loss, have poorer ability to penetrate objects such as buildings, walls, or foliage, and are more susceptible to atmospheric absorption and/or deflection and diffraction due to particles (e.g., rain drops, pollution) in the air. On the other hand, due to the smaller wave lengths, more antennas can be packed in a relative small area, thus enabling high-gain antenna designs in a small form factor. Moreover, because of the disadvantages described above, these radio waves have been less utilized than the lower frequency radio waves. That lower past (and present) utilization presents unique opportunities for new businesses to acquire the spectrum in this band at a lower cost.

Vast amounts of spectrum are available in the millimeter wave band. For example, the frequencies around 60 GHz, which are typically referred to as the 60 GHz band, are available as unlicensed spectrum in most of the countries. In the United States, seven (7) GHz of spectrum around 60 GHz (57 GHz to 64 GHz) is allocated for unlicensed use. On Oct. 16, 2003, the Federal Communications Commission (FCC) issued a Report and Order that allocated 12.9 GHz of spectrum for high-density fixed wireless services in the United States (71-76 GHz, 81-86 GHz, and 92-95 GHz excluding the 94.0-94.1 GHz for Federal Government use). The frequency allocation in 71-76 GHz, 81-86 GHz, and 92-95 GHz are collectively referred to as the E-band. It is the largest spectrum allocation ever by FCC—50 times larger than the entire cellular spectrum.

Millimeter wave wireless communication using component electronics have been previously considered, including millimeter wave communication system that can achieve giga-bits per second (giga-bps) data rates. However, those technologies are not suitable for commercial mobile communication due to issues such as cost, complexity, power consumption, and form factor. The component electronics used in those systems, including power amplifiers, low noise amplifiers, mixers, oscillators, synthesizers, waveguides, are too big in size and consume too much power to be applicable in mobile communication.

Recently, engineering and business efforts have been and are being invested to utilize the millimeter waves for short-range wireless communication. Technologies to transmit data at giga-bps rate have been developed using the unlicensed 60 GHz band within a few meters (up to 10 meters). Integrated circuit (IC) based transceivers are also available for some of these technologies. These technology advancements opened up opportunities that low-cost, low-power radio frequency integrated circuit (RFIC) and antenna solutions can be adapted or built for E-band and other millimeter-wave frequencies.

In summary, millimeter waves come with vast spectrum availability and small antenna element size, making millimeter wave very attractive to support next generation (5G) high data rate mobile communication. In order to overcome the unfavorable propagation characteristics, and to achieve much higher energy efficiency (energy per bit delivered over the air), transmitter and receiver beamforming are considered essential components of millimeter-wave mobile broadband communication.

FIG. 1 is a high level diagram illustrating an exemplary wireless network implementing synchronization according to one or more embodiments of the present disclosure. The wireless network 100 illustrated in FIG. 1 is provided solely for purposes of explaining the subject matter of the present disclosure, and is not intended to suggest any limitation regarding the applicability of that subject matter. Other wireless networks may employ the subject matter depicted in the drawings and described herein without departing from the scope of the present disclosure. In addition, those skilled in the art will recognize that the complete structure and operation of a wireless network and the components thereof are depicted in the drawings and described therein. Instead, for simplicity and clarity, only so much of the structure and operation of the wireless network and the components thereof as are unique to the present disclosure or necessary for an understanding of the present disclosure are depicted and described.

In the illustrated embodiment, wireless network 100 includes a base station (BS) 101, BS 102, and BS 103. Depending on the network type, other well-known terms may be used instead of "base station," such as "Evolved Node B" (eNB) or "access point" (AP). For simplicity and clarity, the term "base station" will be used herein to refer to the network infrastructure components that provide wireless access to remote (mobile or fixed) terminals.

The BS 101 communicates with BS 102 and BS 103 via network 130 operating according to a standardized protocol (e.g., X2 protocol), via a proprietary protocol, or preferably via Internet protocol (IP). IP network 130 may include any IP-based network or a combination thereof, such as the Internet, a proprietary IP network, or another data network.

The BS 102 provides wireless broadband access to a first plurality of mobile stations (MSs) within coverage area 120 of BS 102. In the example illustrated, the first plurality of MSs includes MS 111, which may be located in a small business; MS 112, which may be located in an enterprise; MS 113, which may be located in a wireless fidelity (WiFi) hotspot; MS 114, which may be located in a first residence; MS 115, which may be located in a second residence; and MS 116, which may be a mobile device, such as a cell phone, a wireless laptop, a wireless-enabled tablet, or the like. For simplicity and clarity, the term "mobile station" or "MS" is used herein to designate any remote wireless equipment that wirelessly accesses or communicates with a BS, whether the MS is a mobile device (e.g., cell phone, wireless-enabled tablet or laptop, etc.) or is normally considered a stationary device (e.g., desktop personal computer, wireless television receiver, etc.). In other systems, other well-known terms may be used instead of "mobile station," such as "user equipment" (UE), "subscriber station" (SS), "remote terminal" (RT), "wireless terminal" (WT), and the like.

The BS 103 provides wireless broadband access to a second plurality of MSs within coverage area 125 of BS 103. The second plurality of MSs includes MS 115 and MS 116. In an exemplary embodiment, BSs 101-103 communicate with each other and with MSs 111-116 using millimeter wave wireless communications. While only six MSs are depicted in FIG. 1, it will be understood that wireless network 100 may provide wireless broadband access to additional MSs.

Figure 1A:
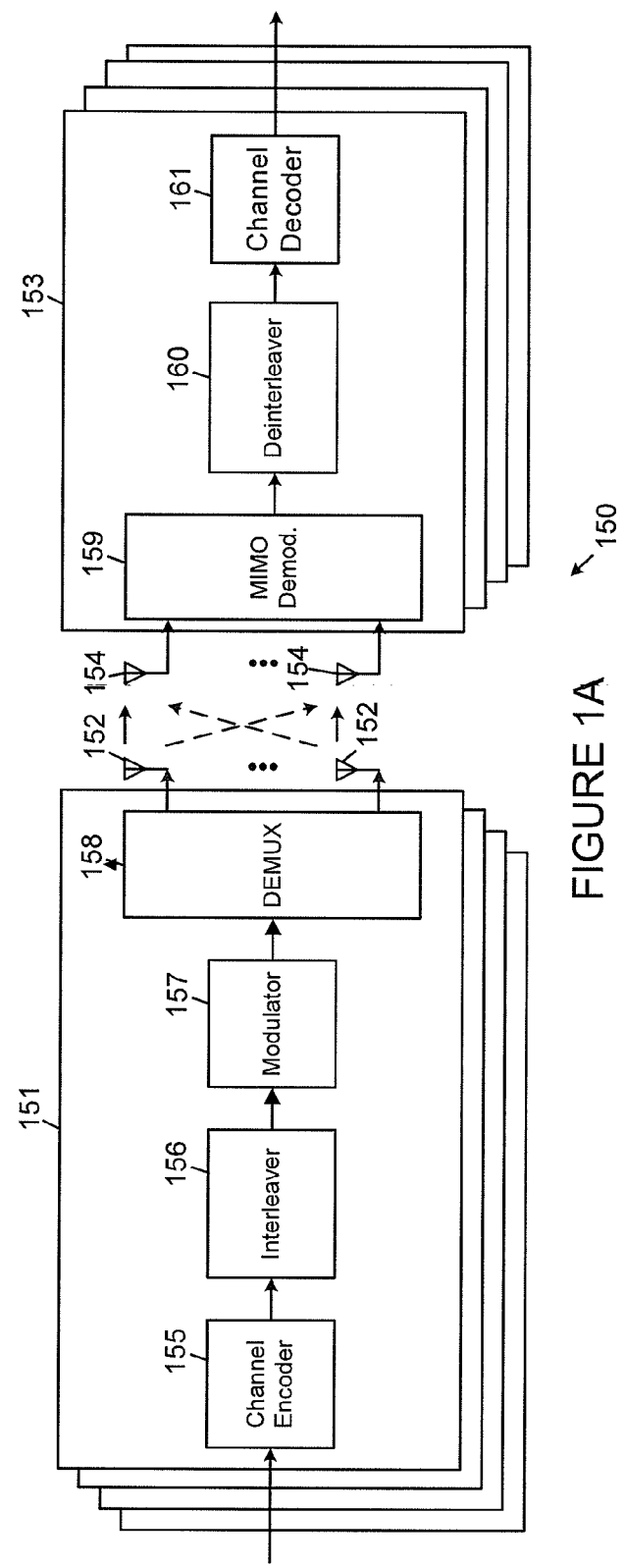
FIG. 1A is a high level block diagram illustrating components of a wireless communication system within FIG. 1.

FIG. 1A is a high level block diagram illustrating components of a wireless communication system within FIG. 1. The wireless communication system 150 depicted in FIG. 1A is a portion of the wireless network 100 of FIG. 1. As understood by those skilled in the art, each BS 101-103 and each MS 111-116 includes an array of antenna or antenna elements, a transmitter and a receiver each separately coupled to the antenna to transmit or receive radio frequency signals, encoding and modulation circuitry within the transmitter chain coupled to the transmitter and demodulation and decoding circuitry within the receiver chain coupled to the receiver, and a programmable processor or controller including and/or connected to memory and coupled to the transmitter and receiver chains for controlling operation of the respective BS or MS.

In the example of FIG. 1A, wireless communication is effected by at least one radio frequency (RF) transmitter chain 151 coupled to an array of antenna or antenna elements 152 and at least one RF receiver chain 153 coupled to an array of antenna or antenna elements 154. In the exemplary embodiment, the transmitter chain 151 forms part of one of BSs 101-103 and the receiver chain 153 forms part of one of the MSs 111-116 in the exemplary embodiment. However, as understood by those skilled in the art, each BS 101-103 and each MS 111-116 includes both a transmitter and a receiver each separately coupled to the respective antenna array to transmit or receive radio frequency signals over the channel therebetween, such that the transmitter chain 151 may alternatively be disposed within one of the MSs 111-116 and the receiver chain 153 may alternatively be disposed within one of the BSs 101-103.

It should be noted that each BS 101-103 and each MS 111-116 may have multiple instances of duplicative RF transmitter and receiver chains 151 and 153 each separately processing signals for transmission on antenna array 152 or signals received on antenna array 154. Four transmitter and receiver chains are depicted in FIG. 1A, although a given communications device (one of BSs 101-103 or MSs 111-116) may have either more or fewer such RF chains. The presence of multiple RF chains may be exploited in connection with the present disclosure in the manner discussed in further detail below.

In the example depicted, the transmitter chain 151 includes encoding and modulation circuitry comprising channel encoder 155 receiving and encoding data for transmission, an interleaver 156 coupled to the channel encoder 155, a modulator 157 coupled to the interleaver 156, and a demultiplexer 158 coupled to the modulator 157 and antenna elements 152. In the example depicted, the receiver chain 153 includes demodulation and decoding circuitry and comprising a demodulator 159 coupled to the antenna elements 154, a deinterleaver 160 coupled to the demodulator 159 and a channel decoder 161 coupled to the deinterleaver 160. In addition, transmitter chain 151 and receiver chain 153 may each be coupled to or include a programmable processor or controller (not shown) including and/or connected to memory (also not shown) and controlling operation of the respective BS or MS. Using such components, synchronization signals are transmitted by a BS and received by an MS in the manner described in further detail below.

Figure 2A:
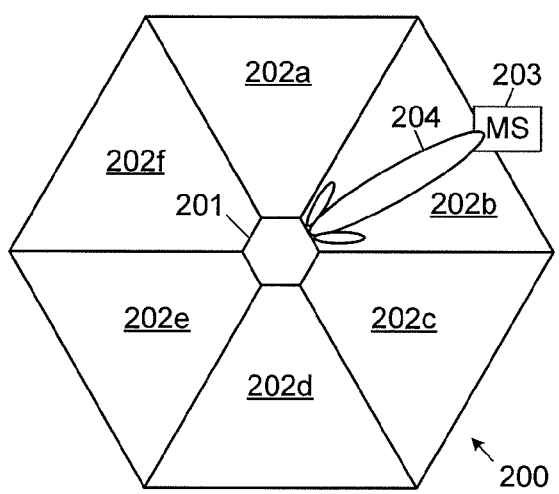
FIGS. 2A and 2B diagrammatically illustrate sectors and slices resulting from beamforming of millimeter wave transmissions in a wireless network implementing synchronization according to one or more embodiments of the present disclosure.
Figure 2B:
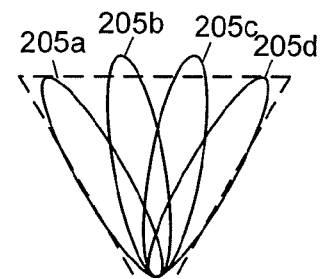

FIGS. 2A and 2B diagrammatically illustrate sectors and slices resulting from beamforming of millimeter wave transmissions in a wireless network implementing synchronization according to one or more embodiments of the present disclosure. In the sector arrangement 200 depicted in FIG. 2A, a base station 201 (which may be any of BSs 101-103 in FIG. 1) includes six (6) sectors 202*a*-202*f* each having radial coverage of 60°. The BS 204 transmits millimeter wave radio signals to an MS 203 (which may be any of MSs 111-116 in FIG. 1) within one of the sectors 202*b* using narrow, steered beams 204 within the respective sector, received by an antenna array at the MS 203. As illustrated in FIG. 2B, each sector 202*a*-202*f* in the base-station (BS) is divided into Q sub-sectors 205*a*-205*d* called "slices." Each slice is outlined by a synchronization channel (SCH) and a broadcast channel (BCH), which are transmitted using wide-beam (i.e., sector-wide) coverage. In the example of FIG. 2B, four slices (Q=4) are depicted, although generalization to any number of slices should be straight-forward.

Figure 3A:
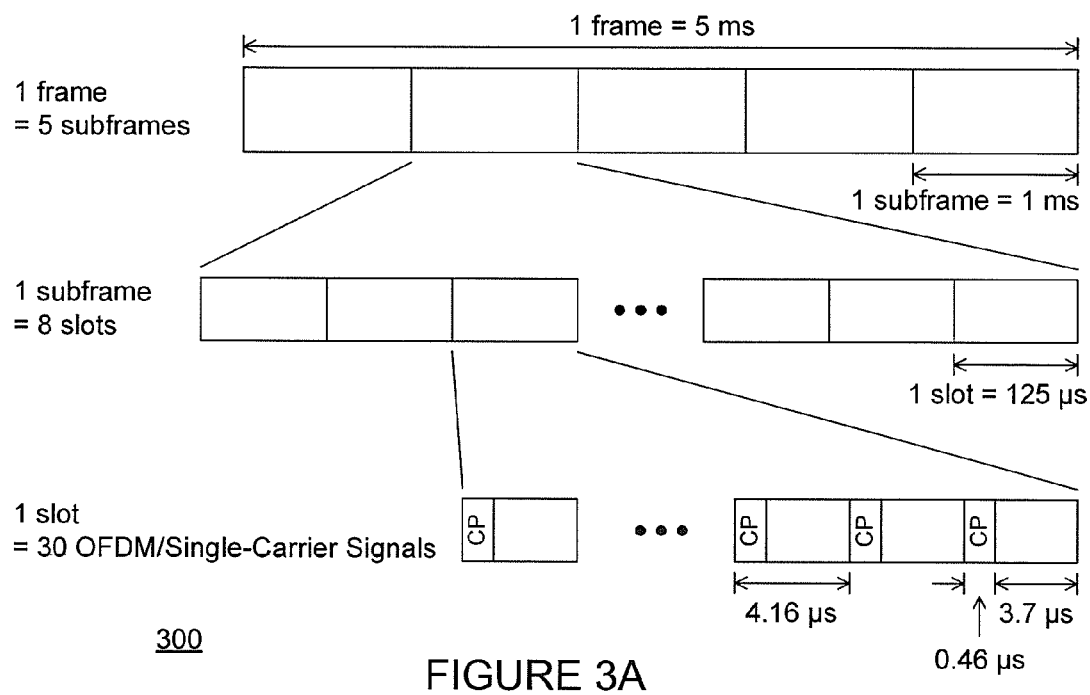
FIGS. 3A through 3C illustrate frame structures for transmissions in a wireless network, including an exemplary frame structure for transmissions within a wireless network implementing synchronization according to one or more embodiments of the present disclosure.
Figure 3B:
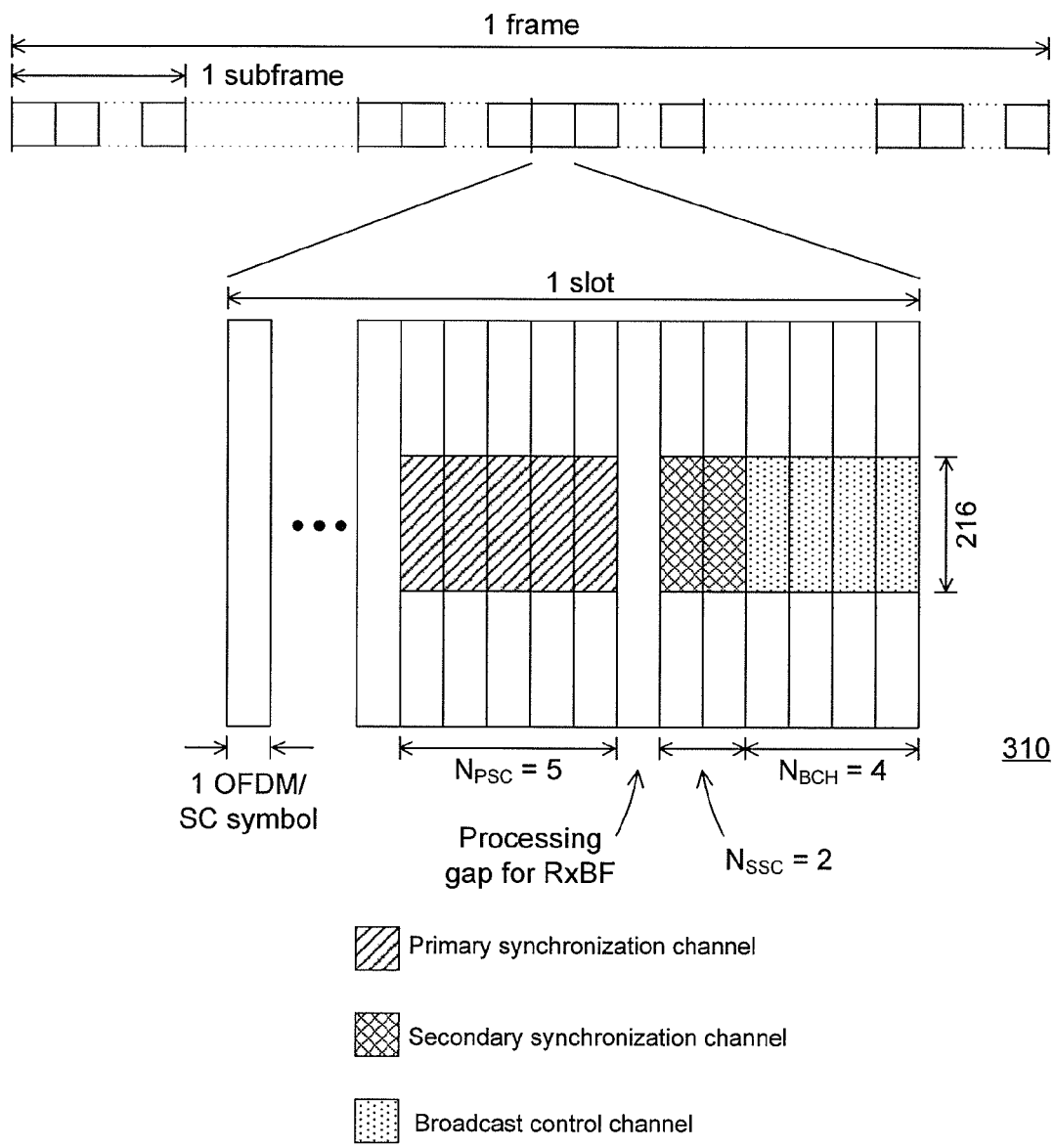
Figure 3C:
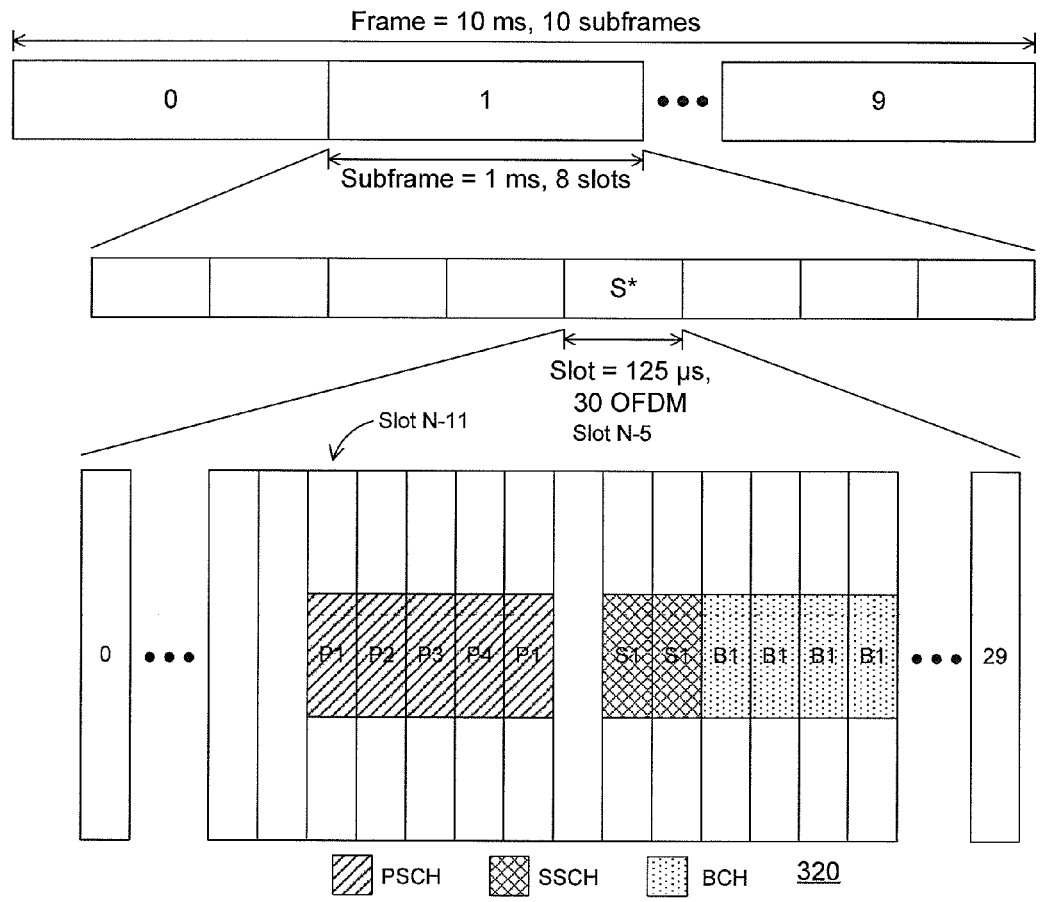

FIGS. 3A through 3C illustrate frame structures for 5G millimeter wave transmissions in a wireless network, including an exemplary frame structure for transmissions within a wireless network implementing synchronization according to one or more embodiments of the present disclosure. The frame structure 300 of FIG. 3A has a frame duration of 5 milliseconds (ms), and each frame consists of 5 subframes with each subframe having a duration of 1 ms. Each subframe consists of 8 slots with each slot having a duration of 125 μs. Each slot consists of 30 Orthogonal Frequency Division Multiplexing (OFDM)/single-carrier (SC) symbols. The symbol duration is 3.7 μs, excluding cyclic prefix (CP). In other words, the OFDM subcarrier spacing is 270 kilo-Hertz (kHz). The CP duration for each symbol is 0.46 μs (⅛ of the OFDM/SC symbol duration). The bandwidth of the system can be 62.5 mega-Hertz (MHz), 125 MHz, 250 MHz, 500 MHz, 1 GHz, and 2 GHz, corresponding to Fast Fourier Transform (FFT) sizes of 256, 512, 1024, 2048, 4096, and 8192, respectively.

In this broadband system, the BS serves several sectors (e.g., 6 sectors) and each sector is divided into Q sub-sectors called slices. Each slice is outlined by a synchronization channel (SCH) and a broadcast channel (BCH), which are transmitted using a wide beam. In the present disclosure, four slices (Q=4) are generally used as an example, but a generalization to other numbers of slices is straightforward.

The frame structure 310 in FIG. 3B includes synchronization signals and the broadcast control channel of a 5G system. The synchronization signals consists of a primary synchronization channel (PSCH) and a secondary synchronization channel (SSCH). The PSCH occupies the center portion of the system bandwidth (e.g., the center 216 subcarriers as shown in FIG. 3B), although certainly the PSCH could occupy either the whole system bandwidth or other portions of the system bandwidth outside of the center portion of the system bandwidth. The PSCH spans across $N_{PSC}$ OFDM/Single-Carrier symbols (in this example, $N_{PSC}$=5). The secondary synchronization channel (SSCH) also occupies the center portion of the system bandwidth, although certainly the SSCH could occupy either the whole system bandwidth or other portions of the system bandwidth. The SSCH spans $N_{SSC}$ OFDM/Single-Carrier symbols (in this example, $N_{SSC}$=2). A gap is introduced between the PSCH and SSCH to allow time for a receiver to process the PSCH, and make adjustment if necessary, before beginning reception of the SSCH. The broadcast control channel (BCH) follows the SSCH.

In the example of FIG. 3B, the PSCH and SSCH occur in the first slot (with duration of 125 μs) of every subframe (with duration of 1 ms). Moreover, all symbols of PSCH and SSCH in the same subframe are transmitted using the same transmit beam, so the MS is expected to switch the receive beam every OFDM symbol (about 4.6 μs). However, this puts a tight constraint on the behavior of the MS, which must keep switching the receive beam very fast, and at the same time must adjust the automatic gain control (AGC) and the other receive algorithms. To relax the constraints on the MS synchronization algorithm, a synchronization scheme should require the BS to switch transmit beams every symbol, while requiring that the MS only switch beams at a much slower speed (e.g., every subframe, or about 1 ms).

In one embodiment of the present disclosure, the BS 201 transmits at least one OFDM symbol as the primary synchronization channel (PSCH) in each slice 205a, 205b, 205c and 205d once every subframe (for example, every 1 ms). In each subframe, after transmitting one PSCH symbol in each slice, the BS 201 transmits one extra PSCH OFDM symbol to resolve the starting-at-the-edge problem, discussed in further detail below. This symbol is transmitted in the same slice as the first transmitted PSCH symbol in that subframe. While the locations of the PSCH symbols within the subframe are fixed, the order of the slices in which the PSCH symbols are transmitted varies from one subframe to the other. For example, if one subframe starts with transmission of the PSCH symbol sequence on slice 205a, the next subframe may start transmission of the PSCH symbol sequence on slice 205b, the next on slice 205c, and so on in round-robin fashion. Though not required, preferably all PSCH symbols are transmitted in one slot, next to each other, and close to the end of the slot. Also, the PSCH symbol transmitted on each slice preferably carries information about the Slice ID.

FIG. 3C depicts an exemplary placement of PSCH symbols in a BS timing frame for 5G millimeter wave transmissions in a wireless network implementing synchronization according to one embodiment of the present disclosure. Given four slices 205a-205d in a sector 202a, the BS 201 transmits five PSCH symbols in each subframe. These symbols are transmitted in the fifth slot of each subframe and next to each other in adjacent symbols (say, on OFDM symbols N−11 to N−7 in the fifth slot, where N=30 is the number of symbols in the slot). In this example, in a first subframe depicted in FIG. 3C, the first PSCH symbol (the leftmost symbol labeled P1 in FIG. 3C, in OFDM symbol N−11) is transmitted in a first slice (e.g., slice 205a), followed by a PSCH symbol P2 in a second slice (e.g., slice 205b), a PSCH symbol P3 in a third slice (e.g., slice 205c), a PSCH symbol P4 in a fourth slice (e.g., slice 205d) 4, and then a second instance of PSCH symbol P1 (the rightmost symbol labeled P1 in FIG. 3C, in OFDM symbol N−7) again in the first slice. The PSCH symbols P1-P4 may be identical except in the indication of the respective slice, and may be transmitted in the center group of subcarriers similar to the manner depicted in FIG. 3B and described above.

In a second subframe following the subframe depicted in FIG. 3C, the first PSCH symbol transmitted in the sequence of five such symbols (in the fifth slot of the subframe) is PSCH symbol P2 transmitted in the second slice (i.e., slice 205b in the example above), followed by PSCH symbol P3 in the third slice (slice 205c), PSCH symbol P4 in the fourth slice (slice 205d), PSCH symbol P1 in the first slice (slice 205a), and then PSCH symbol P2 in the second slice. In the third subframe of the exemplary sequence of subframes, the first PSCH symbol transmitted is PSCH symbol P3 in the third slice, followed by PSCH symbol P4 in the fourth slice, PSCH symbol P1 in the first slice, PSCH symbol P2 in the second slice, and then PSCH symbol P3 in the third slice. In fourth subframe of the example, the first PSCH symbol transmitted is PSCH symbol P4 in the fourth slice, followed PSCH symbol P1 in the first slice, PSCH symbol P2 in the second slice, PSCH symbol P3 in the third slice, and then PSCH symbol P4 in the fourth slice 4. In the fifth subframe, the first PSCH symbol P1 is once again transmitted first, in the first slice, followed by PSCH symbol P2 in the second slice, PSCH symbol P3 in the third slice, PSCH symbol P4 in the fourth slice 4, and then PSCH symbol P1 again in the first slice. This cycling just described continues in the following subframes, as illustrated by FIG. 4, which shows how the BS cycles the slices during transmission of the PSCH symbols within each subframe and across several consecutive subframes.

In another embodiment of the present disclosure, the BS transmission frame structure includes a secondary synchronization channel (SSCH), which consists of one or more symbols located after the five PSCH symbols in each subframe, transmitted in the same slice as the last PSCH symbol transmitted in that subframe. Moreover, the one or more broadcast channel (BCH) symbols immediately follow the SSCH symbols and are transmitted on the same slice as the SSCH. Thus, in the example of FIGS. 2A-2B and 3C, the SSCH symbols S1 occupies two OFDM symbols (say, symbols N−6 and N−5, although optionally a symbol following the five PSCH symbols may be left as a processing gap as described above in connection with FIG. 3B), and the BCH symbols B1 are transmitted in four OFDM symbols (N−4, N−3, N−2, and N−1 in the example being described).

The proposed synchronization scheme relaxes the constraints on the MS. As shown in FIG. 4, the MS can switch receive beams once every subframe period (1 ms in this example) rather than for every OFDM symbol (4.6 μs) and still successfully find the PSCH. MS1 in FIG. 4 shows the typical behavior of an MS with four receive beams searching for the PSCH. When turned ON, MS1 starts searching for the PSCH for a period of 1 subframe (1 ms) using a first receive (Rx) beam. During this subframe period MS1 identifies the best PSCH detected using that first receive beam. Then MS1 switches to a second receive beam for another 1 ms subframe period to identify the best PSCH using that receive beam, and then continues in like manner for the third and fourth receive beams. Within four subframes (4 ms), MS1 should identify the best slice and the best receive beam to be used to receive data from the BS, after which the MS can use the best receive beam to search for the SSCH corresponding to the best slice. The procedure is described in further detail below in connection with FIG. 5.

Note that after detecting the PSCH symbol on any slice, the MS will be able to synchronize to the BS at the OFDM symbol level, and thus will be able to perform frequency synchronization to the BS (either by using the CP of the PSCH, or based on reception of a special PSCH with two identical halves from the BS).

In another embodiment of this disclosure, two bits of the subframe number within the frame can be identified from the PSCH structure. Thus the number of subframes in a frame is preferably equal to the number of slices or an integer multiple of the number of slices. By way of example, given four slices as in FIG. 2B, the number of subframes in a frame is preferably either 4 or 8. In another example, if the number of slices within a sector were five, then either 5 or 10 subframes in each frame would be preferred.

FIG. 4 depicts rotation of synchronization symbols to different symbol positions within a slot across subframes in a frame for transmissions in a wireless network implementing synchronization according to embodiments of the present disclosure. FIG. 4 depicts four subframes 401-404 from a frame including four or eight subframes. As shown, the PSCH symbols P1, P2, P3, P4 and P1 transmitted in subframe 401 (e.g., "Subframe 0" of a frame) will transmitted respectively over slices 205a, 205b, 205c, 205d and 204a, in that sequence. The second subframe 402 ("Subframe 1" of the frame) will have PSCH symbols P2, P3, P4, P1 and P2 transmitted respectively on slices 205b, 205c, 205d, 205a and 205b; the third subframe 403 ("Subframe 2" of the frame) will have PSCH symbols P3, P4, P1, P2 and P3 transmitted respectively on slices 205c, 205d, 205a, 205b and 205c; and the fourth subframe ("Subframe 3" of the frame) will have PSCH symbols P4, P1, P2, P3 and P4 transmitted respectively onslices 205d, 205a, 205b, 205c and 205d. In a frame with eight subframes, the pattern of subframes 401-404 would repeat.

By identifying the two identical PSCH symbols that are transmitted in the same slice, separated by three OFDM symbols, the MS can determine the subframe number in the frame. Also, the SSCH and BCH in different subframes can be used to carry the subframe number within the frame. Assume a frame with eight subframes, then the PSCH, SSCH, and BCH symbols in the subframes will be (from Subframes 0 to Subframe 7):

[P1, P2, P3, P4, P1] [S1] [B1],
[P2, P3, P4, P1, P2] [S2] [B2],
[P3, P4, P1, P2, P3] [S3] [B3],
[P4, P1, P2, P3, P4] [S4] [B4],
[P1, P2, P3, P4, P1] [S1] [B1],
[P2, P3, P4, P1, P2] [S2][B2],
[P3, P4, P1, P2, P3] [S3] [B3],
[P4, P1, P2, P3, P4] [S4] [B4].

In this example, only one bit in the BCH is required (along with the PSCH pattern, or the SSCH) to identify the subframe number within the frame.

The proposed synchronization scheme relaxes constraints on the behavior of the MS. Note that in the proposed synchronization scheme, MS1 switches receive beams once every 1 ms, and so MS1 can search for PSCH and SSCH simultaneously. However, MS1 must do that using the same Rx beam (assuming the MS has only one RF chain). The receive beam used in MS1 is fixed for 1 ms in the proposed synchronization scheme, compared to 4.6 μs described above. Moreover, if the MS successfully received the PSCH and SSCH for a given slice and the quality of reception was above predefined threshold (as described below), then the MS can try to receive BCH using the same Rx beam.

Figure 5A:
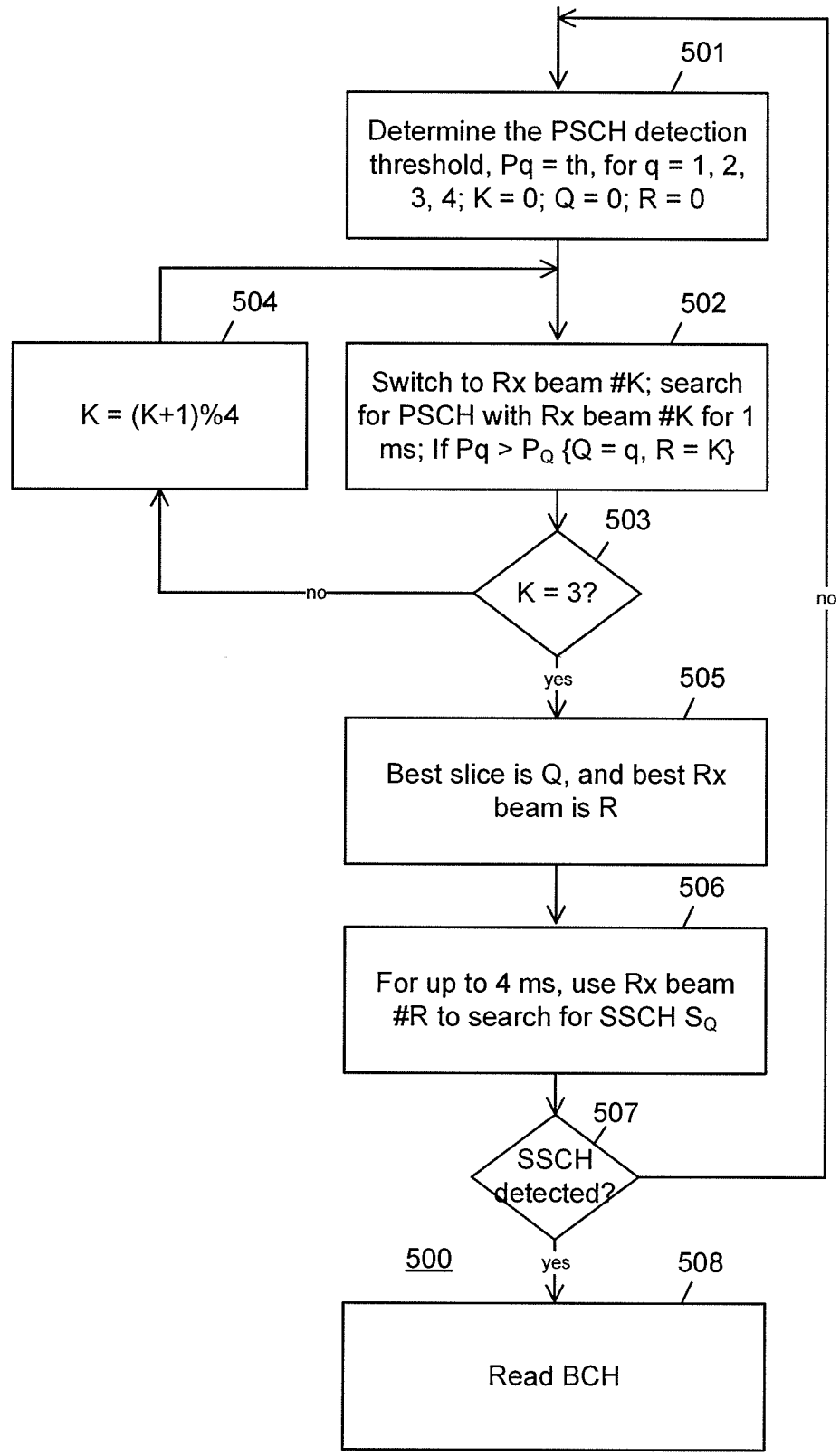
FIGS. 5A and 5B are high level flowcharts of processes employed by a mobile station to detect synchronization symbols across subframes in a frame for transmissions in a wireless network implementing synchronization according to embodiments of the present disclosure.
Figure 5B:
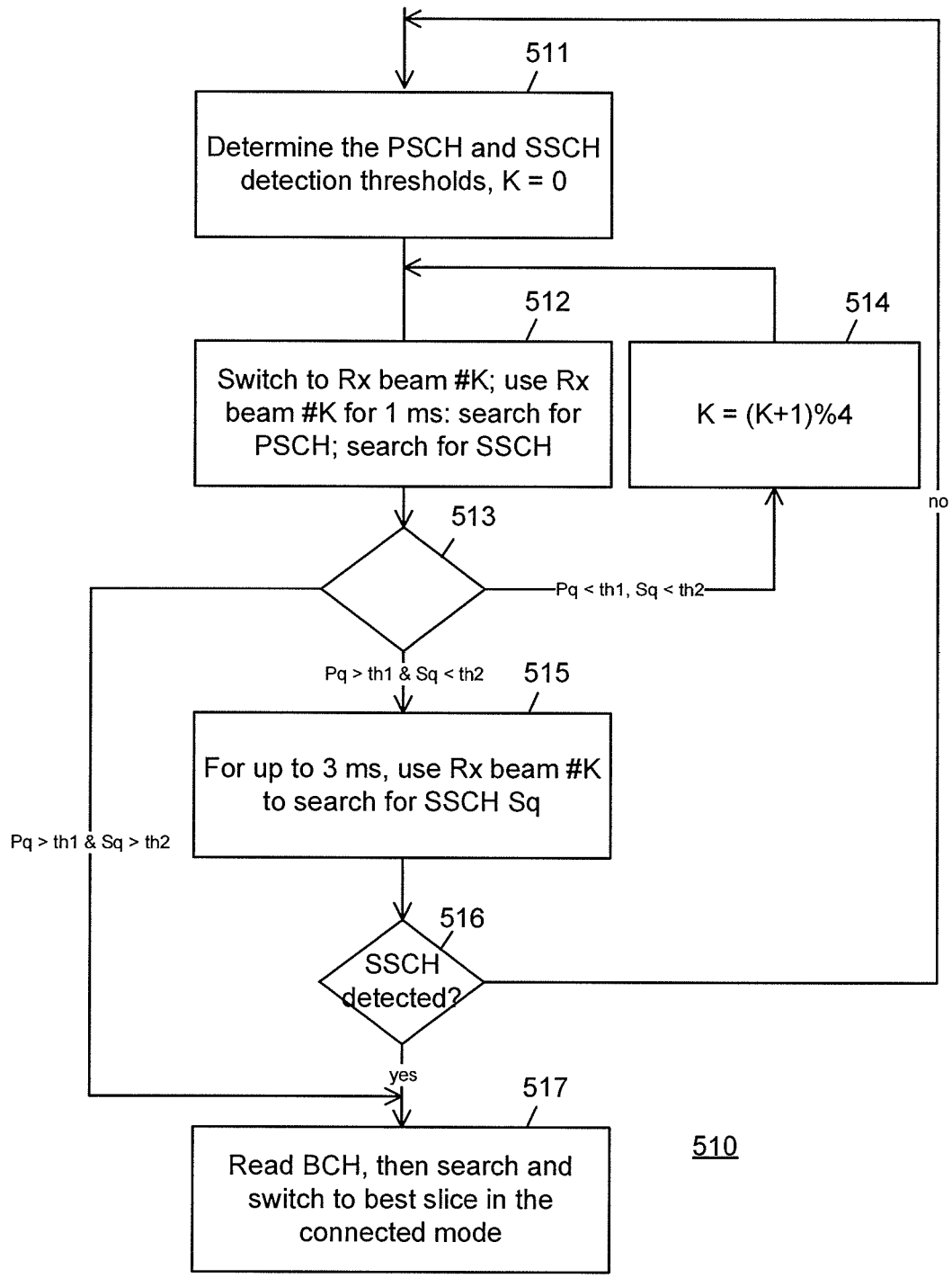

FIGS. 5A and 5B are high level flowcharts of processes employed by a mobile station to detect synchronization symbols across subframes in a frame for transmissions in a wireless network implementing synchronization according to embodiments of the present disclosure. While each flow chart depicts a series of sequential steps, unless explicitly stated no inference should be drawn from that sequence regarding specific order of performance, performance of steps or portions thereof serially rather than concurrently or in an overlapping manner, or performance the steps depicted exclusively without the occurrence of intervening or intermediate steps. Moreover, those skilled in the art will recognize that a complete process is not illustrated or described. Instead, for simplicity and clarity, only so much of the respective processes as is unique to the present disclosure or necessary for an understanding of the present disclosure is depicted and described.

The process portion 500 depicted in FIG. 5A for detection of synchronization symbols PSCH and SSCH by a mobile station begins with the MS initializing the PSCH detection metrics Pq to a threshold th far all slices q=1, 2, 3, and 4 (step 501). An example of the PSCH detection metric is the cross correlation between the received signal and a reference PSCH signal. An MS starts searching for a PSCH symbol using a first of four receive beams K=0 for a period of (for example) 1 ms. (The period 1 ms is merely an example, based on one example of the periodicity of SCH in the system frame structure). An identifier Q of the transmit beam producing the largest PSCH detection metric at the MS is initially set to zero (and P0 is set to a threshold th) and an identifier R of the receive beam producing the largest PSCH detection metric at the MS is initially set to the value of the current receive beam (i.e., R=K=0). The MS switches to the receive beam (Rx) #K using the current value of K (i.e., 0 for the first pass) and searches for PSCH symbols with receive beam #K for 1 ms (step 502).

If a q-th PSCH symbol is detected (i.e., the PSCH detection metric Pq is greater than the threshold th), the new PSCH detection metric Pq is compared to the previously-detected maximum PSCH detection metric $P_Q$. If Pq is greater than $P_Q$, then Q is set to the value of q and R is set to the current value of K. The process then continues until all receive beams have been tried, which in the example involves determining if the current value of K is three (3) (step 503), the highest number identifier for a receive beam in the exemplary embodiment (K=0, 1, 2, and 3). If not, the value of K is incremented to an integer value less than 4 (step 504) and the process repeats the switch to the receive beam identified by the current value of K and searches for PSCH symbols (step 502). If the value of K is equal to 3 (i.e., all receive beams have been tried), the process then sets the identifier of the best slice to the current value of Q and the identifier of the best receive beam to the current value of R (step 505).

For up to 4 ms, the mobile station then uses the identified best receive beam #R to search for SSCH symbols $S_Q$ (step 506). A determination is then made as to whether the SSCH symbols were detected (step 507). If not, the process portion 500 restarts (step 501), searching again for PSCH symbols on all receive beams. If so, however, the process reads the BCH (step 508), and continues with other operations necessary to provide wireless communications between the BS and MS.

An alternative process portion 510 depicted in FIG. 5B for detection of synchronization symbols PSCH and SSCH by a mobile station begins with the MS determining the PSCH detection threshold th1 and the SSCH detection threshold th2, and setting the counter K to a value for a first receive beam K=0 (step 511). The MS then switches to receive beam #K and uses receive beam Rx=#K to search for PSCH symbols and to search for SSCH symbols (step 512). The measured PSCH detection metric Pq is then compared to the threshold th1 and the measured SSCH detection metric Sq is compared to the threshold th2 (step 513). Based on the measurement for PSCH detection metric Pq and SSCH detection metric Sq relative to thresholds th1 and th2, respectively, different paths are followed by the process. If Pq<th1 (and optionally also if Sq<th2), the value of K is incremented to an integer value less than 4 (step 514) and the process repeats the switch to the receive beam identified by the current value of K and the search for PSCH and SSCH symbols using that receive beam (step 512).

If Pq>th1 but Sq<th2, for up to 3 ms the MS will use the current receive beam Rx #K to search for SSCH symbols Sq (step 515), and a determination is made as to whether the SSCH symbol(s) have been detected (step 516). If not, the process portion 500 restarts (step 501), once again determining thresholds th1 and th2 and searching again for PSCH and SSCH symbols on one of the receive beams. If the SSCH symbol(s) were detected, the MS reads the BCH (step 517), then searches for and switches to the best slice in connected mode using the receive beam determined by the steps described above. The process then continues with other operations necessary to provide wireless communications between the BS and MS.

Referring back to the comparison (step 513) of the measurement for PSCH detection metric Pq and SSCH detection metric Sq relative to thresholds th1 and th2, respectively, if Pq>th1 and Sq>th2, the process proceeds directly to reading the BCH (step 517) and searching for and switching to the best slice. As will be apparent to those skilled in the art, one of the alternatives depicted in FIGS. 5A and 5B and described above determines the best slice and best receive beam concurrently, while the other first determines the best receive beam, then searches for the best slice.

FIG. 6 illustrates avoiding start-at-the-edge problems for mobile station detection of synchronization symbols by duplication of a synchronization symbol within a slot for transmissions in a wireless network implementing synchronization according to embodiments of the present disclosure. Four subframes 601-604 transmitted by two alternative base stations BS1 and BS2 to a mobile station MS2 are illustrated, with the PSCH symbol sequence for synchronization used by base station BS1 and an alternative PSCH symbol sequence—in which the first PSCH symbol of the sequence is not repeated—used by base station BS2. To demonstrate how the proposed synchronization scheme does not suffer from the start-at-the-edge problem, consider the case where slice 1 (corresponding to the PSCH symbol P1 in the first OFDM symbol of the PSCH symbol sequence for subframe 601) is the only slice for MS2 to connect to BS2, and which can only be received via RX beam 1. Note that if MS2 is turned ON in the middle of (or within) the symbol P1 and keeps cycling the receive beam every 1 ms, MS2 will never see BS2. Also, the same will happen if the best slice is slice 2, received via RX beam 1, and MS2 is turned ON in the middle of P2 and kept cycling the receive beam; MS2 will never identify slice 2, RX beam 1 as the best beam pair. As evident, the same can be said for slices 3 and 4. In contrast, in the proposed synchronization scheme (used by BS1 in FIG. 6), any Pq located at the edge of the PSCH symbol sequence for a 1 ms period of the receive beam Rx is repeated within the same 1 ms period. Thus, even if MS2 is turned ON in the middle of the first transmission of OFDM symbol P1 in the PSCH symbol sequence, MS2 can still identify that slice 1, RX beam 1 is the best beam pair for the transmission.

Another relaxation on the behavior of the MS by the proposed synchronization scheme is that, when the MS need to train the automatic gain control (AGC) portion of the RF chain in the MS, the MS can do this in one subframe and then search for the PSCH in the following subframe. This makes the time between AGC training and PSCH search only 1 ms instead of 4 ms.

In another embodiment of the present disclosure, a gap of at least 3 (preferably only 3) OFDM symbols is placed between the PSCH symbols and the SSCH symbols in the respective slot. This allows the MS to search for PSCH on one Rx beam then switch to another Rx beam within the same subframe, to receive SSCH on the other beam. In one scenario, if two PSCH symbols are detected with a time difference of 4 OFDM symbols between them, then those PSCH symbols are transmitted on the same slice. Also, the SSCH and BCH of the same slice are transmitted in the same subframe and the SSCH is located 3 symbols from the second PSCH (assuming a gap of exactly 3 symbols). Moreover, these two PSCH symbols identify the exact boundary of the PSCH region (that is, exact within the delay spread of the channel). Accordingly, the MS will no longer need to switch the receive beam every 1 ms. Instead, the MS knowledge of the PSCH region and SSCH and BCH region allow the MS to choose one Rx beam to monitor PSCH and another Rx beam to detect SSCH and receive BCH. In the other scenario, when the MS is turned ON and starts switching the receive beam once every 1 ms, the MS detects only one PSCH. Also, in this scenario the MS should not continue switching the receive beam once every 1 ms. All other PSCH symbols (transmitted on the other slices) are within the three symbols before and the three symbols after the detected duplicated PSCH symbol. This allows the MS to set a PSCH detection/monitoring region in these seven OFDM symbols, and set the SSCH and BCH detection/monitoring region in the following Ws symbols (where Ws=4+number of SSCH and BCH symbols).

FIG. 7 depicts transmission of secondary synchronization and broadcast channel symbols on all slices in every subframe during transmissions in a wireless network implementing synchronization according to embodiments of the present disclosure. In another embodiment of the present disclosure, SSCH and BCH symbols are transmitted in more than one slice in each subframe. An exemplary case, where SSCH and BCH symbols are transmitted on all slices in every subframe 701-704, is depicted in FIG. 7. This will allow faster synchronization and BCH acquisition, but at the cost of increased overhead. The order of cycling slices of SSCH and BCH symbols when those slices are transmitted in all slices every subframe is shown in FIG. 7. The sequence of SSCH and BCH symbols Zq (representing both SSCH symbol Sq and BCH symbol Bq), begins with the same slice as transmission of the duplicate PSCH symbols within the PSCH symbol sequence for the respective subframe. Thus, in the subframe 701 in FIG. 7, the sequence of SSCH and BCH symbols Zq begins with Z1 (since PSCH symbol P1 was transmitted twice in that subframe), then proceeds in order to Z2, Z3 and Z4. In the next subframe 702, the sequence of SSCH and BCH symbols Zq begins with Z2 (since PSCH symbol P2 was transmitted twice), then proceeds in order to Z3 and Z4 and, in cyclic (round-robin) fashion, to Z1. The rotation continues for subframes 703 and 704, as shown in FIG. 7.

Figure 8:
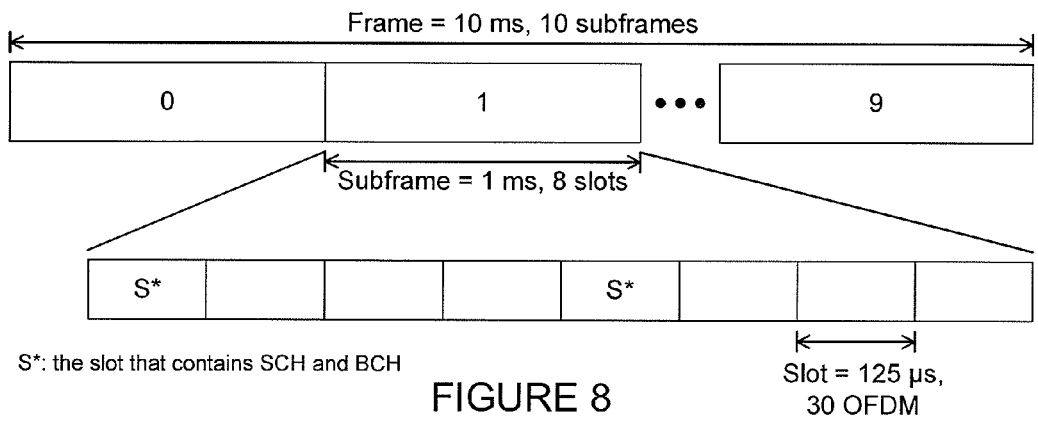
FIG. 8 depicts transmission of secondary synchronization and broadcast channel symbols in two slots of every subframe during transmissions in a wireless network implementing synchronization according to embodiments of the present disclosure.

FIG. 8 depicts transmission of secondary synchronization and broadcast channel symbols in two slots of every subframe during transmissions in a wireless network implementing synchronization according to embodiments of the present disclosure. In another embodiment of the present disclosure, SCH and BCH can be repeated in more than one slot in each subframe. An exemplary case is depicted in FIG. 8, where SCH and BCH are repeated in two slots (the first and fourth, in the example depicted) in each subframe, represented in FIG. 8 by S*. The SCH/BCH symbol transmission sequence can be either of the two proposed schemes described above or another scheme. In the other schemes, both SCH/BCH regions in the same subframe should be transmitted in the same slice, which will speed up acquiring BCH and may simplify the AGC adjustment algorithm.

In the synchronization schemes of FIGS. 3A and 3B, the PSCH and SSCH occur in one slot (with duration of 125 µs) of every subframe (with duration of 1 ms), and all SCH and BCH in the same subframe are transmitted using the same slice. However, for such schemes there are several disadvantages for putting all the synchronization information in one slot: 1) the MS needs to adjust AGC gain each time the MS switches the Rx-beam. The AGC gain is estimated in the baseband (BB), and then the setting is sent to the RF. As the communication between the BB and RF is relatively slow (compared to the 4 µs long OFDM symbol), the MS needs to estimate the AGC setting in one subframe, then wait for a second chance after Nt ms (assuming Nt Tx beams). 2) In an asynchronous system, there is no guarantee that the PSCH symbols from different BSs will arrive at the same time. And so, in the above designs, the MS needs to spend periodically four subframes (assuming 4 slices) scanning for best slice, sector, or BS. 3) Having all PSCH symbols next to each other puts tougher constraints on the MS RF chain to switch the Rx-beam every OFDM symbol.

Figure 9:
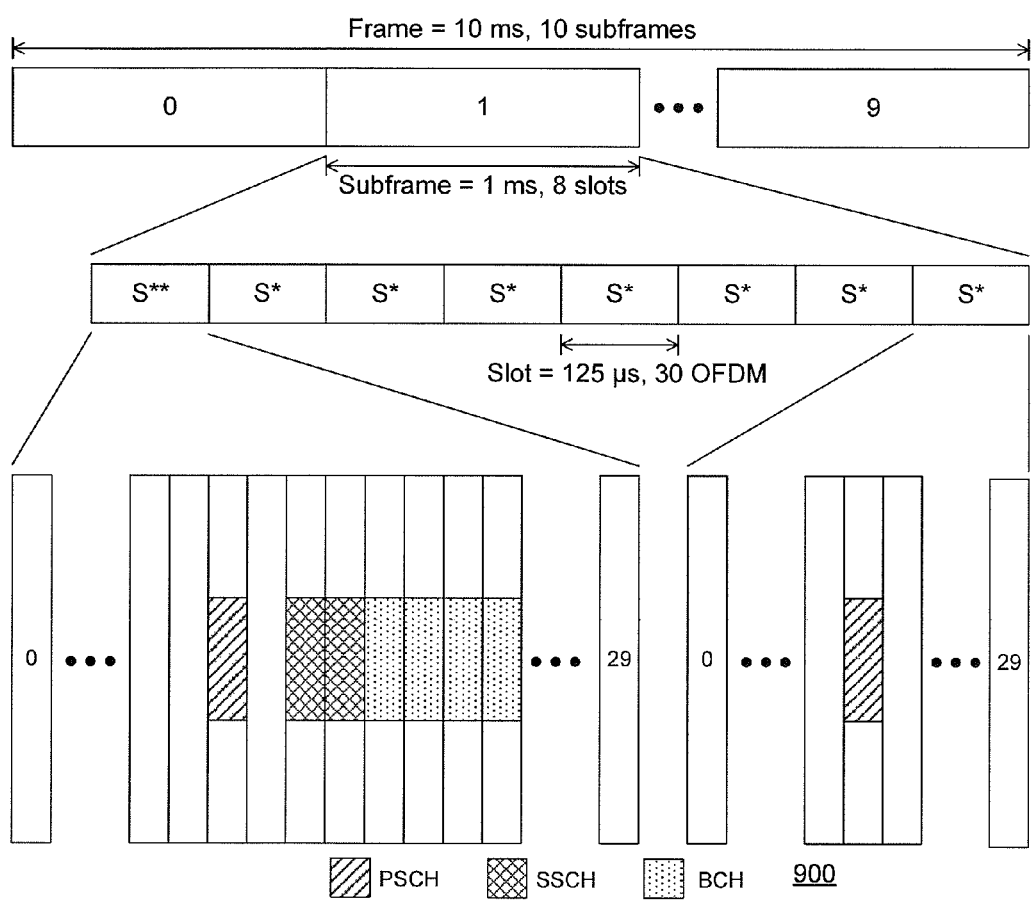
FIGS. 9 and 10A-10D illustrate spreading PSCH symbols across slots of every subframe during transmissions in a wireless network implementing synchronization according to embodiments of the present disclosure.

FIGS. 9 and 10A-10D illustrate spreading PSCH symbols across slots of every subframe during transmissions in a wireless network implementing synchronization according to embodiments of the present disclosure. In another embodiment of the current disclosure, the PSCH symbols are spread across the slots as shown in FIG. 9. In the frame structure 900 depicted, one instance of the PSCH symbol is included in the first slot (denoted S** in FIG. 9) of a subframe, at OFDM symbol position N−x within the slot, and is followed in that first slot (with an intervening symbol) by the SSCH and BCH symbols. In remaining slots S* of the subframe, the PSCH symbol is included at symbol position N−x. In the example depicted, the SSCH and BCH symbols are not included in the remaining slots S* of the subframe. The frame structure 900 thus includes one PSCH in each slot of every subframe, and SSCH and BCH symbols in the first slot.

Figure 10A:
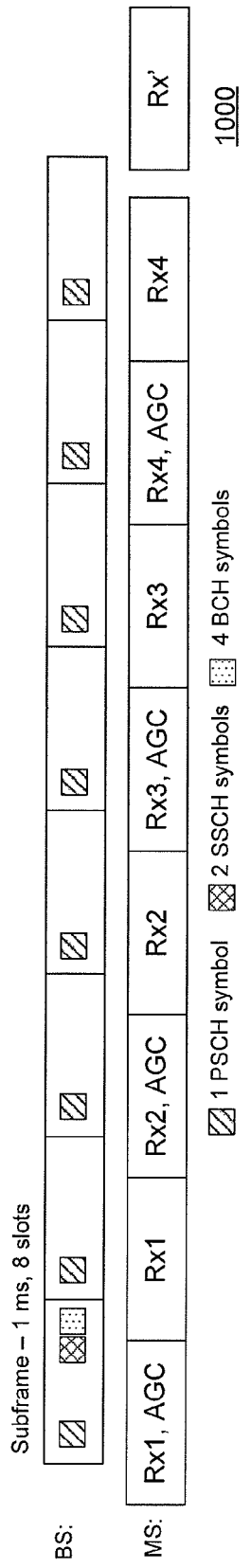
Figure 10B:
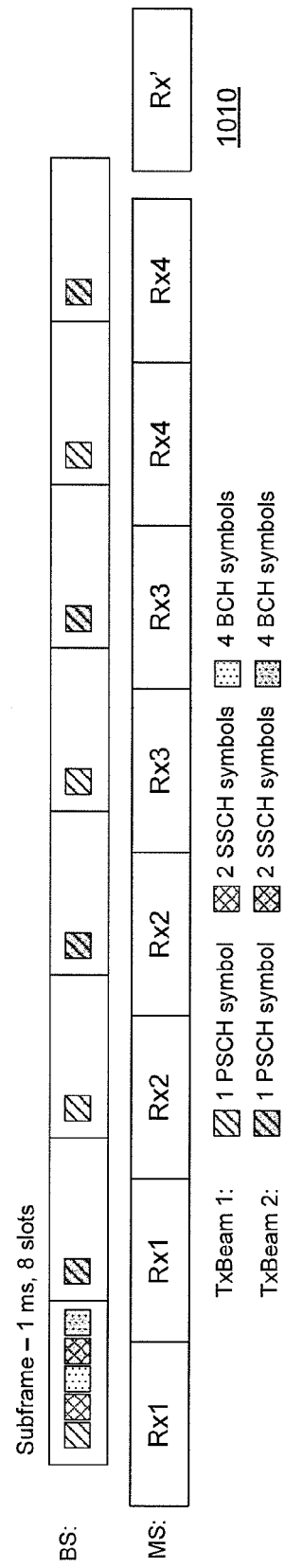
Figure 10C:
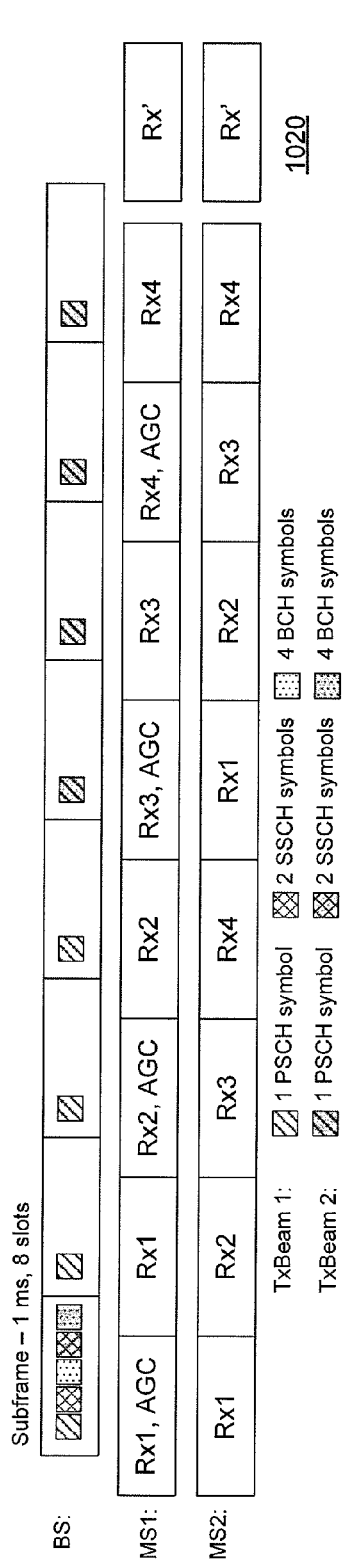
Figure 10D:
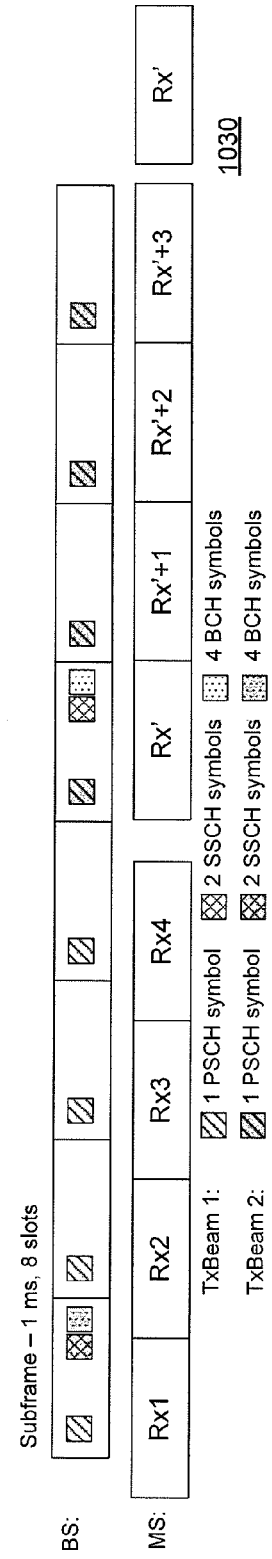

Other alternatives for spreading the PSCH across the slots are illustrated by FIGS. 10A-10D. The frame structure 1000 depicted in FIG. 10A is the same as the frame structure 900 of FIG. 9, depicted by an alternative representation. FIG. 10B illustrates a frame structure 1010 in which alternate slots contain PSCH symbols transmitted by different Tx beams (and SSCH and BCH symbols in the first slot also transmitted on different Tx beams). The frame structure 1010 thus employs two Tx beam in the same subframe; the following subframe can have another two Tx beams. The same is true of frame structure 1020 depicted in FIG. 10C, in which the first four slots of the subframe contain PSCH symbols transmitted by a first Tx beam while the last four slots contain PSCH symbols transmitted by a second, different Tx beam. The frame structure 1030 depicted in FIG. 10D uses the same distribution of PSCH symbols on different TX beams, but also splits the SSCH/BCH symbols (on different Tx beams) between the first and fourth slots.

Figure 11A:
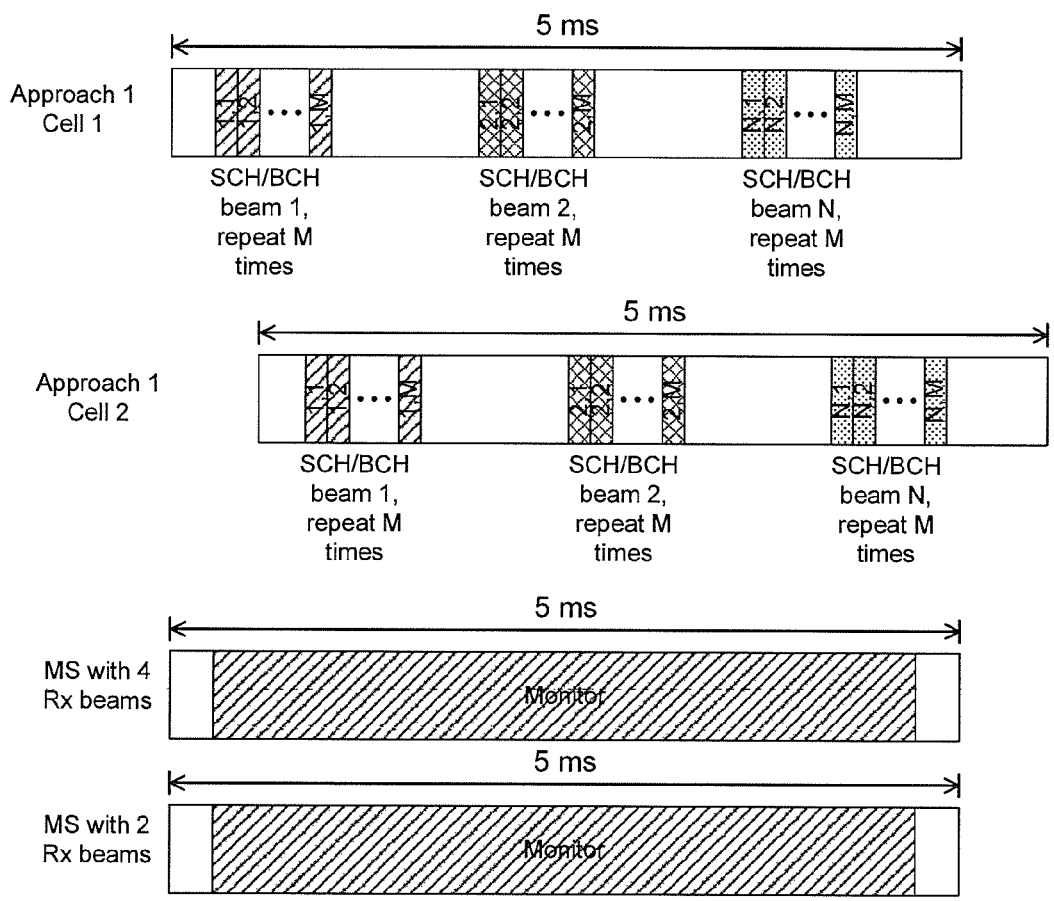
FIGS. 11A-11C illustrate cell monitoring intervals during transmissions in a wireless network implementing synchronization according to embodiments of the present disclosure.
Figure 11B:
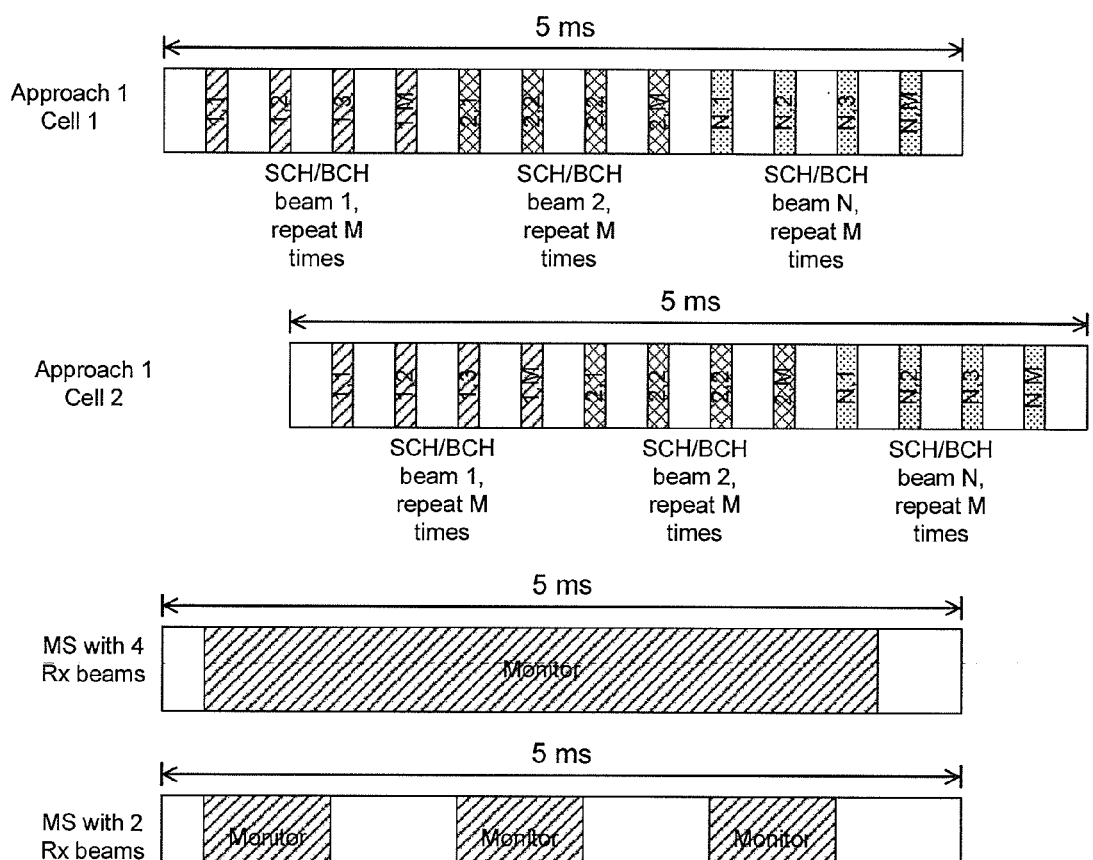
Figure 11C:
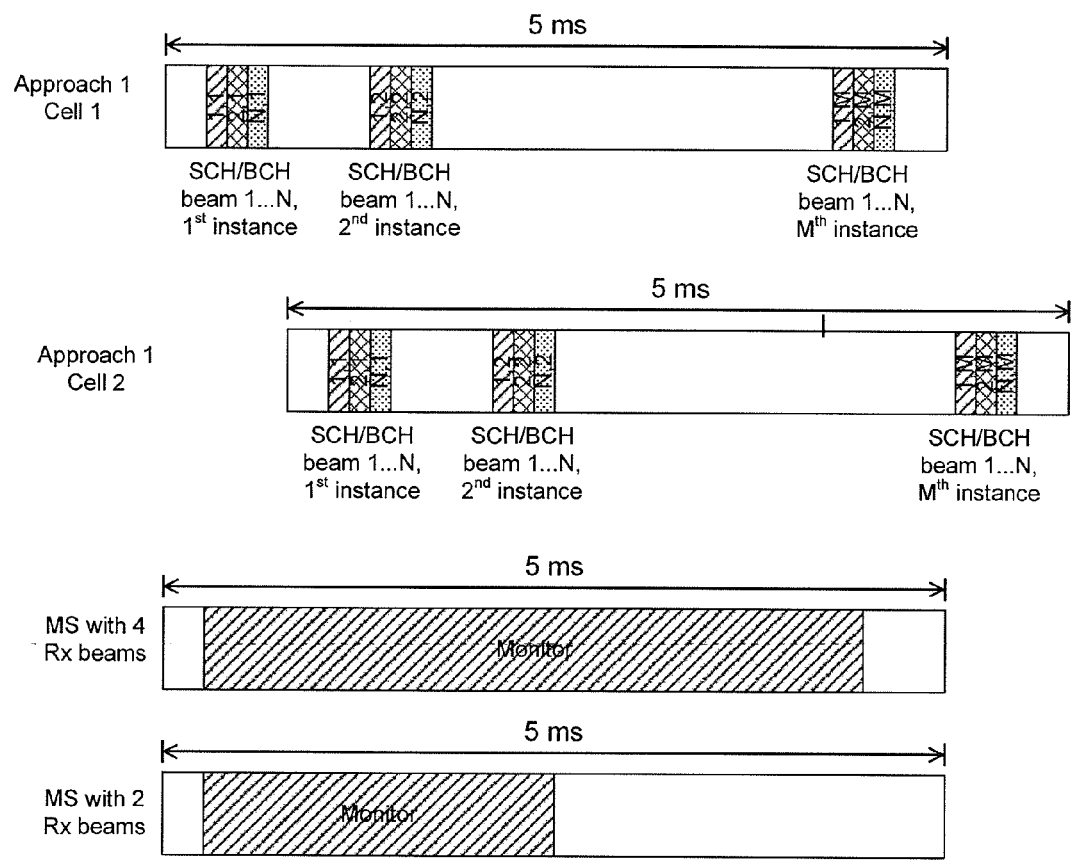

FIGS. 11A-11C illustrate cell monitoring intervals during transmissions in a wireless network implementing synchronization according to embodiments of the present disclosure. The proposed synchronization schemes in this disclosure affect the cell monitoring intervals. The cell monitoring procedures are discussed in more depth in the incorporated patent document entitled "CELL SCANNING IN MILLIMETER WAVE COMMUNICATIONS." FIG. 11A illustrates monitoring cells and slices in scheme depicted in FIG. 3A; FIG. 11B illustrates monitoring cells and slices in the scheme depicted in FIG. 3B; and FIG. 11C illustrates monitoring cells and slices in the scheme depicted in FIG. 3C.

In one embodiment of the present disclosure, a BS with r RF-chains transmits up to s PSCH symbols simultaneously, where s=min{r,Q} The PSCH region is fixed in the subframe and consists of Q+1 OFDM (preferably consecutive) symbols. On the first RF-chain, the BS transmits PSCH exactly as in the single RF-chain case—that is, on the first RF-chain, the BS transmits one PSCH symbol in each slice once every subframe (for example, every 1 ms). In each subframe, after transmitting one PSCH symbol in each slice, the BS transmits one extra PSCH symbol to resolve the starting-at-the-edge problem. Each time the BS transmits a PSCH symbol using the first RF-chain in Slice i, the BS also transmits a PSCH symbol in Slice i+1 using a second RF-chain, and a PSCH symbol in Slice i+2 using a third RF-chain, and so on.

FIG. 12 depicts rotation of synchronization symbols to different symbol positions across subframes in a frame for transmissions by a base station having multiple RF chains in a wireless network implementing synchronization according to embodiments of the present disclosure. FIG. 12 illustrates rotation of synchronization symbols for an exemplary BS with four RF-chains and covering a 4-slice sector (Q=4). On each RF-chain, the BS transmits five PSCH symbols in each subframe. Those five symbols are transmitted in the fifth slot and next to each other (say, on OFDM symbols N−11 to N−7 in the fifth slot, where N=30 is the number of symbols in the slot).

In this example, in the (N−11)th symbol of the fifth slot of Subframe 1201, the BS transmits a PSCH symbol in Slice 1 (labeled P1) using RF-chain 1, and simultaneously transmits a PSCH symbol in Slice 2 (labeled P2) using RF-chain 2, a PSCH symbol in Slice 3 (labeled P3) using RF-chain 3, and a PSCH symbol in Slice 4 (labeled P4) using RF-chain 4. In the (N−10)th symbol of the fifth slot of Subframe 1201, the BS transmits a PSCH symbol in Slice 2 (P2) using RF-chain 1, and simultaneously transmits a PSCH symbol in Slice 3 (P3) using RF-chain 2, a PSCH symbol in Slice 4 (P4) using RF-chain 3, and a PSCH symbol in Slice 1 (P1) using RF-chain 4. In the (N−9)th symbol of the fifth slot of Subframe 1201, the BS transmits a PSCH symbol in Slice 3 (P3) using RF-chain 1, and simultaneously transmits a PSCH symbol in Slice 4 (P4) using RF-chain 2, a PSCH symbol in Slice 1 (P1) using RF-chain 3, and a PSCH symbol in Slice 2 (P2) using RF-chain 4. In the (N−8)th symbol of the fifth slot of Subframe 1201, the BS transmits a PSCH symbol in Slice 4 (P4) using RF-chain 1, and simultaneously transmits a PSCH symbol in Slice 1 (P1) using RF-chain 2, a PSCH symbol in Slice 2 (P2) using RF-chain 4, and a PSCH symbol in Slice 3 (P3) using RF-chain 4. In the (N−7)th symbol of the fifth slot of Subframe 1201, the BS transmits a PSCH symbol in Slice 1 (P1) using RF-chain 1, and simultaneously transmits a PSCH symbol in Slice 2 (P2) using RF-chain 2, a PSCH symbol in Slice 3 (P3) using RF-chain 4, and a PSCH symbol in Slice 4 (P4) using RF-chain 4.

In Subframe 1202, the BS cycles the RF-chains on the slices. That is, in the (N−11)th symbol of the fifth slot of Subframe 1202, the BS transmits P2, P3, P4, and P1 from RF-chains 1, 2, 3, and 4, respectively. In the (N−10)th symbol of the fifth slot of Subframe 1202, the BS transmits P3, P4, P1, and P2 from RF-chains 1, 2, 3, and 4, respectively. In the (N−9)th symbol of the fifth slot of Subframe 1202, the BS transmits P4, P1, P2, and P3 from RF-chain 1, 2, 3, and 4, respectively. In the (N−8)th symbol of the fifth slot of Subframe 1202, the BS transmits P1, P2, P3, and P4 from RF-chains 1, 2, 3, and 4, respectively. In the (N−7)th symbol of the fifth slot of Subframe 1202, the BS transmits P2, P3, P4, and P1 from RF-chains 1, 2, 3, and 4, respectively. The cycle continues in following subframes 1203-1204 as shown in FIG. 12.

FIG. 13 depicts rotation of synchronization symbols to different symbol positions across subframes 1301-1304 in a frame for transmissions by a base station having multiple RF chains in a wireless network implementing synchronization according to embodiments of the present disclosure. FIG. 13 illustrates one possible rotation of synchronization symbols for an exemplary BS with two RF-chains and covering a 4-slice sector. A rotation scheme similar to that of FIG. 12 is employed, except with fewer concurrently transmitted PSCH symbols.

Figure 14:
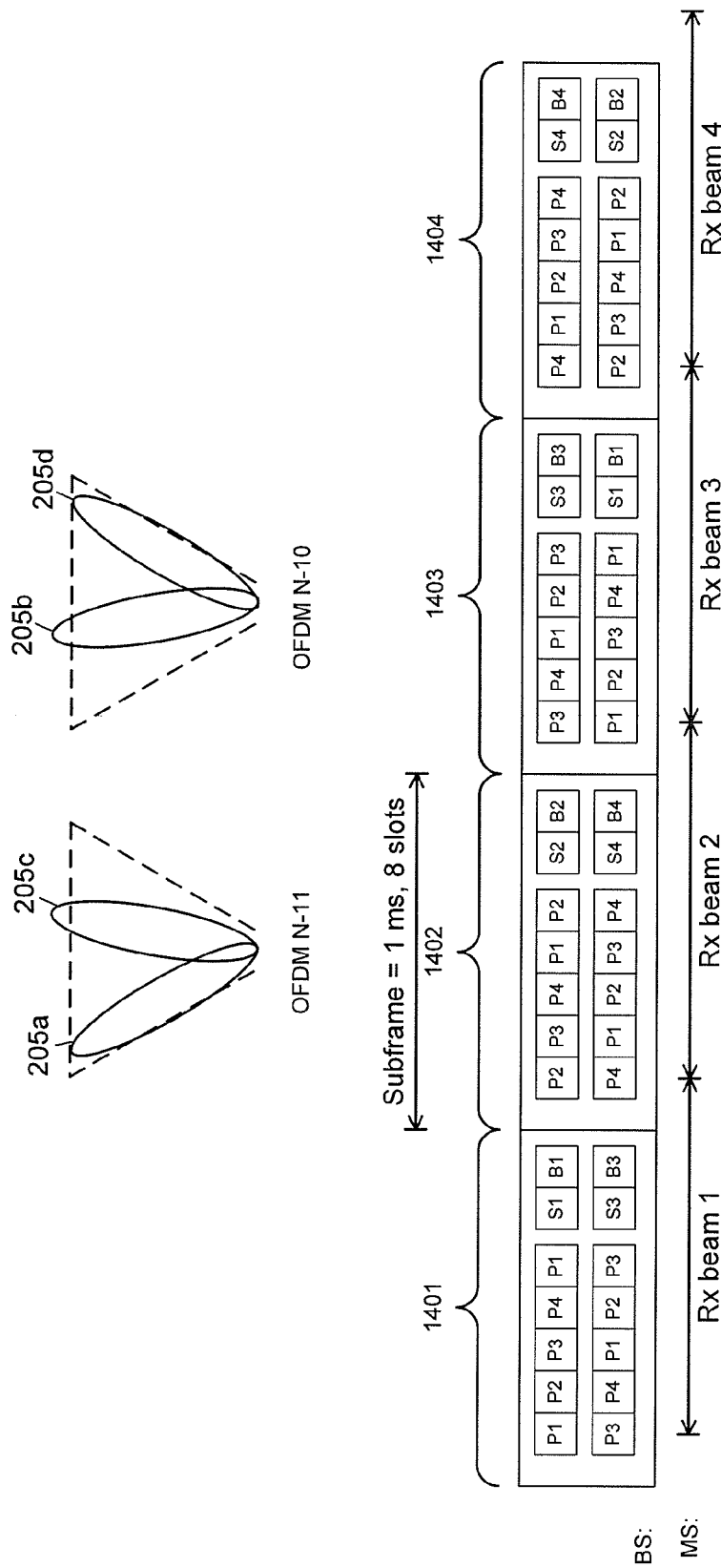
FIG. 14 depicts an alternative rotation of synchronization symbols to different symbol positions across subframes in a frame for transmissions by a base station having multiple RF chains in a wireless network implementing synchronization according to embodiments of the present disclosure.

FIG. 14 depicts an alternative rotation of synchronization symbols to different symbol positions across subframes in a frame for transmissions by a base station having multiple RF chains in a wireless network implementing synchronization according to embodiments of the present disclosure. In another embodiment of the present disclosure, when a number of available RF-chains used in synchronization is less than the number of slices, the BS should transmit simultaneous PSCH symbols on the slices in a manner minimizing the long-term interference between the SCHs. The long-term interference between the slices can be estimated at the site planning, or can be predicted from the BS past learning.

As an example, a BS with two RF-chains may cover a 4-slice sector (in FIG. 14, Slice 1 is labeled 205*a*, Slice 2 is labeled 205*b*, Slice 3 is labeled 205*c*, and Slice 4 is labeled 205*d* for consistency with FIG. 2B) in which interference between Slice 1 and 2 is larger than interference between Slice 1 and 3, interference between Slice 3 and 4 is larger than interference between Slice 2 and 4, and interference between Slice 2 and 3 is larger than interference between Slice 1 and 3. In that situation, the BS should transmit PSCH symbols as shown in FIG. 14. FIG. 14 illustrates PSCH transmission for a BS with 2-RF chains covering a sector with 4 slices while trying to reduce SCH inter-slice interference. In this example, the BS exploits the pairs of slices between which inter-slice interference is the lowest (Slices 1 and 3 and Slices 2 and 4, in this example).

Note that, in the example of FIG. 14 as in the examples of FIGS. 12 and 13, the BS permutes the RF-chains and the slices. For example, in Subframe 1401 the BS uses RF-chain 1 to transmit SSCH symbol in Slice 1, and in Subframe 1403 the BS uses RF-chain 2 to transmit SSCH symbol in Slice 1. This cycling allows the MS to estimate not only the best slice, but also the preferred RF-chain to be used with this slice. To enable that, however, in one embodiment of the present disclosure, the BS uses different SSCH sequences for each slice. In Subframe-k, the BS transmits the SSCH on Slice-j from RF-chain i, where i is given by a formula so that the MS can know i from j and k without any ambiguity. For example, a BS with 4 RF-chains and covering 4 slices can use i=j+(k mod 4). The Slice ID, j, can be identified after PSCH detection or SSCH detection. The subframe number can be encoded in the BCH. In an alternative embodiment, the (k·mod 4) subframe number can be encoded as a cyclic shift in the SSCH sequence or the PSCH sequence.

Note that the MS synchronization algorithm is independent of how many RF chains the BS uses to transmit the SCH. For example, for an MS using a single RF chain and thus needing to scan four receive beams, the synchronization algorithm depicted in FIG. 5A may be employed. However, if the MS has multiple RF-chains, the MS can use those chains to speed up the synchronization process. For example, an MS with two RF chains can use the synchronization algorithm in FIG. 15.

Figure 15:
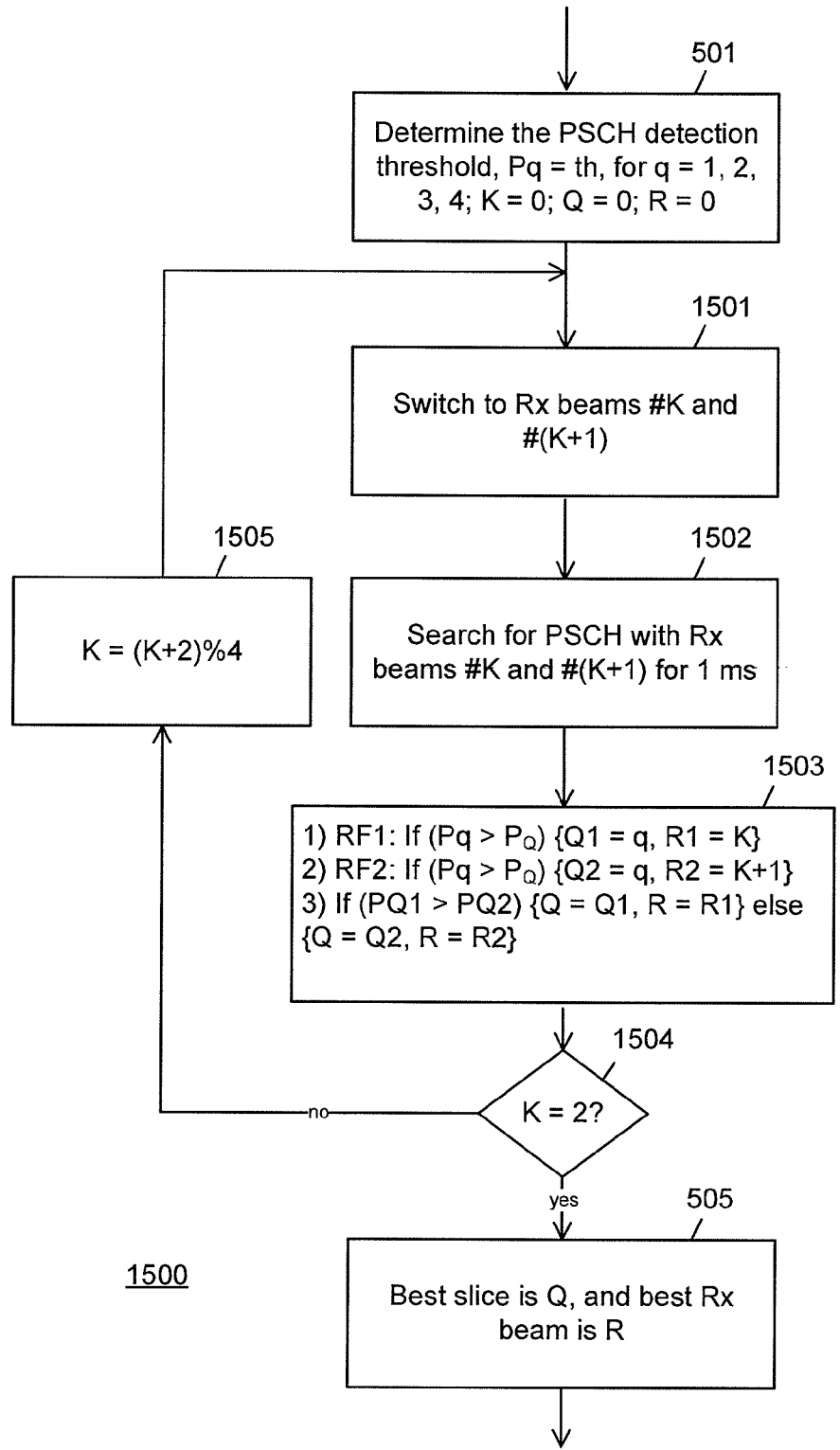
FIG. 15 is a high level flowchart of a process employed by a mobile station with multiple RF chains to detect synchronization symbols across subframes in a frame for transmissions in a wireless network implementing synchronization according to embodiments of the present disclosure.

FIG. 15 is a high level flowchart of a process employed by a mobile station with multiple RF chains to detect synchronization symbols across subframes in a frame for transmissions in a wireless network implementing synchronization according to embodiments of the present disclosure. The example process portion of FIG. 15 illustrates an MS synchronization algorithm using two RF chains instead of one (but still searching four transmit beams). The process portion 1500 illustrated differs from the process of FIG. 5A in that, after the initial determination of the PSCH detection threshold (step 501), the MS switches to Rx beams #K and #(K+1) (step 1501) and searches for PSCH with those Rx beams for 1 ms (step 1502). For each receiver chain RF1 and RF2, the MS determines whether the respective PSCH detection metric $P_q$ exceeds the previously-detected maximum PSCH detection metric $P_Q$ and, if so, sets the preferred slice Q1, Q2 for that receiver chain to the current slice and the preferred Rx beam R1, R2 for that receiver chain to the respective current Rx beam #K or #(K+1) (step 1503). The MS also compares the PSCH detection metrics for the two receiver chains and selects the larger as the overall preferred slice and Rx beam. If there are still receive beams that have not been examined (step 1504), the value of K is appropriately incremented (step 1505) before repeating the switching of receive beams and search for PSCH.

The MS can set a threshold for PSCH detection and, after detecting a PSCH in, say, Rx-beam j, can keep one RF chain scanning for PSCH in the other Rx-beams and use the other RF-chain to scan for SSCH using Rx-beam j. The MS can wait to scan all Rx-beams and for enough time to scan all BS slices (assuming the smallest number of RF chains the BS is allowed to use in synchronization) before deciding which Rx-beams and on which slice the MS wants to connect to the BS. Alternatively, once the MS detect a SSCH above certain threshold, the MS can connect to the BS on the Rx-beam and slice related to that SSCH. After that, the MS updates the preferred Rx-beam and Slice in the connected state.

In another embodiment of the present disclosure, after a MS connects to the BS, the BS informs the MS about the number of RF chains used for SCH, which enables the MS to scan for a preferred slice transmit RF chain on the downlink (in addition to the best slice). Also, this information facilitates estimation by the MS of the delay spread across multiple slices, and computation of the long term inter-slice interference. This information can be feed to the BS to improve the like quality between the BS and the MS.

In another embodiment of the present disclosure, a BS with r RF-chains uses more than one RF-chain (up to r RF chains) to transmit SCH and BCH on the same slice. The BS should use beam broadening techniques to guarantee that the transmitted SCH is covering the whole slice.

Figure 16:
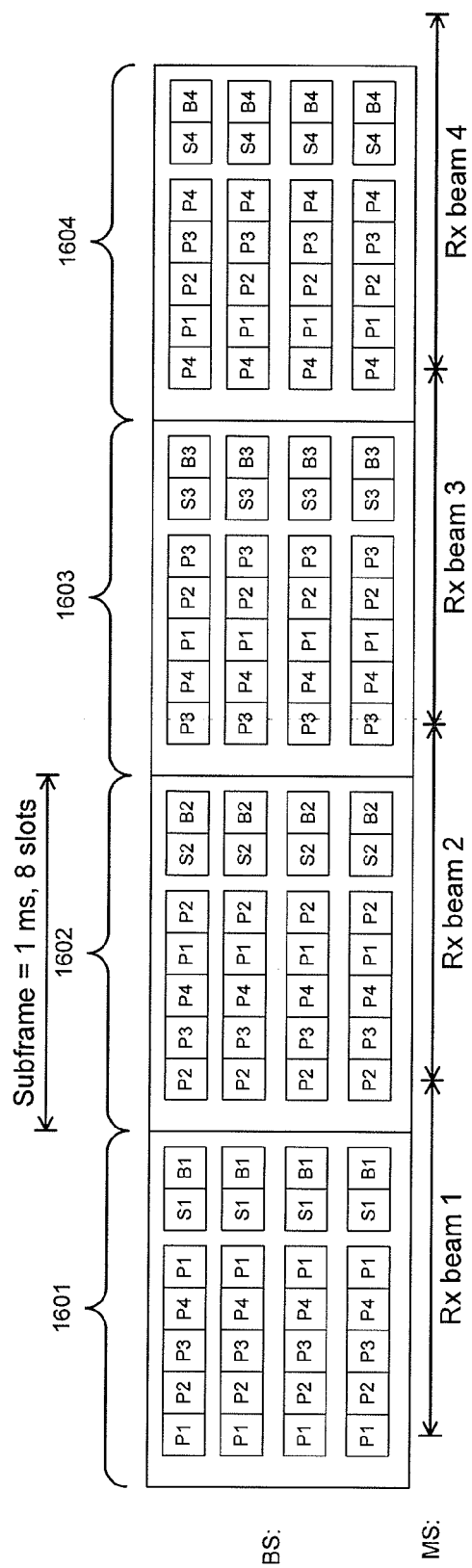
FIG. 16 depicts another alternative rotation of synchronization symbols to different symbol positions across subframes in a frame for transmissions by a base station having multiple RF chains in a wireless network implementing synchronization according to embodiments of the present disclosure.

FIG. 16 depicts another alternative rotation of synchronization symbols to different symbol positions across subframes in a frame for transmissions by a base station having multiple RF chains in a wireless network implementing synchronization according to embodiments of the present disclosure. FIG. 16 illustrates operation of an exemplary BS with four RF-chains and covering a 4-slice sector (Q=4) one slice at a time. In this example, in the (N−11)th symbol of the fifth slot of Subframe 1601, the BS transmits a PSCH symbol in Slice 1 using RF-chains 1, 2, 3, and 4. In the (N−10)th symbol of the fifth slot of Subframe 1601, the BS transmits a PSCH symbol in Slice 2 using all RF-chains. In the (N−9)th symbol of the fifth slot of Subframe 1601, the BS transmits a PSCH symbol in Slice 3 using all RF-chains. The same pattern is followed for the remaining PSCH symbols of Subframe 1601 and in Subframes 1602-1604. Compared to the embodiment of FIG. 12, the scheme in FIG. 16 does not speed the worst case time of detecting SCH and reading BCH. However, the scheme of FIG. 16 provides better coverage since in this scheme the BS can transmit more power in each slice than in the scheme of FIG. 12. Accordingly, if SCH/BCH coverage is a problem, the scheme in FIG. 16 is preferable. Otherwise, the scheme in FIG. 12 is preferable.

Note that in both schemes (FIG. 16 and FIG. 12), the SCH/BCH scheme for, say, the first RF chain is not dependent on the number of RF chains used in transmitting SCH/BCH. The BS can decide to use more RF chains to enhance the SCH/BCH performance or synchronization speed. It is important to keep the MS synchronization algorithm independent from the number of RF-chains used by the BS in the SCH/BCH and, to achieve this, the location and size (in number of OFDM symbols) of SSCH and BCH should be fixed regardless of the number of RF-chains used by the BS. However, the proposed synchronization algorithms allows some flexibility in the PSCH region. Using this observation, more efficient use of the BS resources may be achieved. In another embodiment of the present disclosure, the BS reduces the PSCH size as more RF-chains are used for SCH/BCH.

Figure 17A:
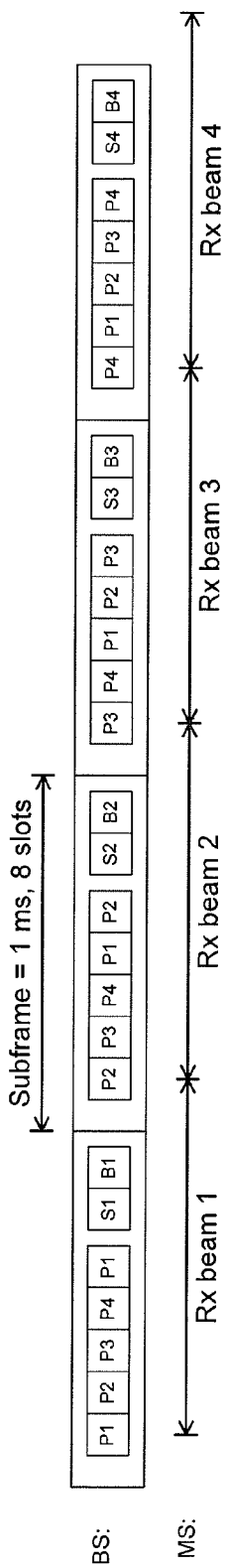
Figure 17B:
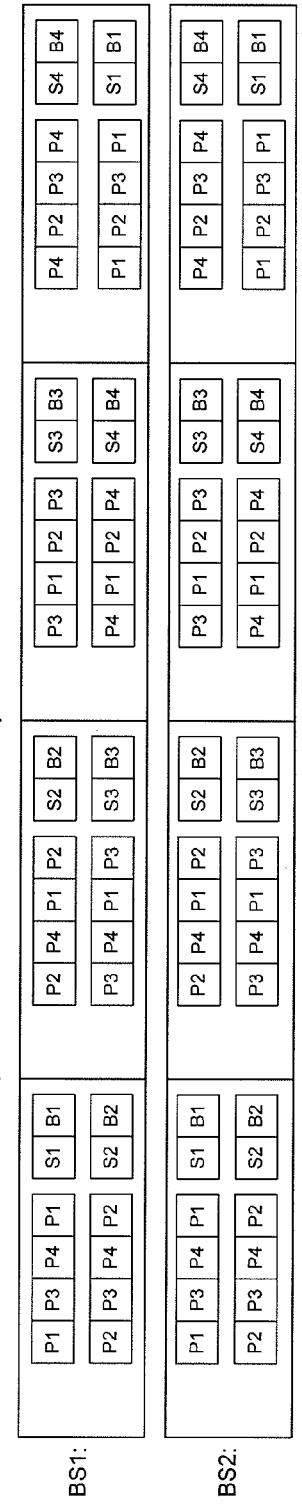

FIGS. 17A-17D depict SCH/BCH schemes with variable PSCH regions for a BS using different numbers of RF chains in a wireless network implementing synchronization according to embodiments of the present disclosure. FIG. 17A depicts a SCH/BCH scheme with a variable PSCH region for a BS using a single RF chain. FIG. 17B depicts a SCH/BCH scheme with a variable PSCH region for a BS using two RF chains. FIG. 17C depicts a SCH/BCH scheme with a variable PSCH region for a BS using four RF chains. An exemplary BS with 4 RF-chains and covering 4 slices will use the SCH/BCH scheme in FIG. 17A if one RF chain is used, the scheme in FIG. 17B if two RF chains are used, and the scheme in FIG. 17C if four RF chains are used. In another variation, the BS can place gaps in place of the dropped PSCH symbols as shown in FIG. 17D to maintain a fixed boundary PSCH. The gaps can be used as resources for other channels in the system such as the physical data shared channel (PDSCH).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station, comprising:
an antenna array configured to transmit beam-steered signals in each of a plurality of slices with a sector; and
a transmitter configured to cause the antenna array to transmit a sequence of primary synchronization symbols within predetermined symbol positions in at least one slot of a subframe,
wherein the sequence of primary synchronization symbols includes primary synchronization symbols transmitted on different slices of the plurality of slices, and
wherein a first primary synchronization symbol is transmitted in a first symbol position on a first slice of the plurality of slices, and the first primary synchronization symbol is re-transmitted in an (S+n)th symbol position on the first slice, where S is the number of the plurality of slices within the sector and n is an integer value.

2. The base station according to claim 1, wherein the sequence of primary synchronization symbols includes primary synchronization symbols transmitted during a single predetermined slot of the subframe on each of S slices within the sector.

3. The base station according to claim 2, wherein the sequence of primary synchronization symbols includes a primary synchronization symbol transmitted in S+1 symbol positions on one of the S slices.

4. The base station according to claim 3, wherein the sequence of primary synchronization symbols includes, in a kth subframe, where k is an index for subframes in a frame,
a second primary synchronization symbol transmitted in a second symbol position on a second slice of the plurality of the slices, and
an Sth primary synchronization symbol transmitted in an Sth symbol position on an Sth slice of the plurality of the slices.

5. The base station according to claim 4, wherein the sequence of primary synchronization symbols includes, in a (k+1)th subframe following the kth subframe,
the second primary synchronization symbol transmitted in the first symbol position on the second slice, the Sth primary synchronization symbol transmitted in the (S−1)th symbol position on the Sth slice, the first primary synchronization symbol transmitted in the Sth symbol position on the first slice, and the second primary synchronization symbol transmitted in the (S+1)th symbol position on the second slice.

6. The base station according to claim 1, wherein a first sequence of the primary synchronization symbols is transmitted within a predetermined slot of a first subframe and a second sequence of the primary synchronization symbols is transmitted within a predetermined slot of a second subframe following the first subframe.

7. The base station according to claim 1, wherein secondary synchronization symbols and broadcast channel symbols are transmitted during a single predetermined slot following the primary synchronization symbols.

8. The base station according to claim 1, wherein a single predetermined slot contains five consecutive primary synchronization symbols.

9. The base station according to claim 8, wherein the single predetermined slot contains two secondary synchronization symbols and four broadcast channel symbols following the five consecutive primary synchronization symbols.

10. The base station according to claim 9, wherein the secondary synchronization symbols are separated from the five consecutive primary synchronization symbols by one or more symbols.

11. The base station according to claim 9, wherein the secondary synchronization symbols and broadcast channel symbols are transmitted on a same slice as a last symbol of the sequence of primary synchronization symbols.

12. The base station according to claim 1, wherein secondary synchronization symbols are transmitted in more than one of the plurality of slices following the primary synchronization symbols in a predetermined slot in the subframe.

13. The base station according to claim 1, wherein a subframe number for the subframe is related to an order of the primary synchronization symbols in the subframe.

14. The base station according to claim 1, wherein the sequence of primary synchronization symbols includes a first group of Q primary synchronization symbols concurrently transmitted on Q different slices of the plurality of slices, where Q is less than or equal to the smallest of a number of radio frequency (RF) chains within the base station and a number of the plurality of slices, using a plurality of Q RF chains.

15. The base station according to claim 1, wherein the base station is configured to use R radio frequency (RF) chains within the base station to transmit R concurrent primary synchronization symbols on R of the slices, and is further configured to select the R slices based at least in part on inter-slice interference.

16. The base station according to claim 1, wherein the base station is configured to transmit to a mobile station a number of radio frequency (RF) chains used for synchronization channel transmission.

17. A method, comprising:
transmitting beam-steered signals in each of a plurality of slices within a sector; and
transmitting a sequence of primary synchronization symbols within predetermined symbol positions in at least one slot of a subframe,
wherein the sequence of primary synchronization symbols includes primary synchronization symbols transmitted on different slices of the plurality of slices, and
wherein a first primary synchronization symbol is transmitted in a first symbol position on a first slice of the plurality of slices, and the first primary synchronization symbol is re-transmitted in an (S+n)th symbol position on the first slice, where S is the number of the plurality of slices within the sector and n is an integer value.

18. The method according to claim 17, wherein the sequence of primary synchronization symbols includes primary synchronization symbols transmitted during a single predetermined slot of the subframe on each of S slices within the sector.

19. The method according to claim 18, wherein the sequence of primary synchronization symbols includes a primary synchronization symbol transmitted in S+1 symbol positions on one of the S slices.

20. The method according to claim 18, wherein the sequence of primary synchronization symbols includes, in a kth subframe, where k is an index for subframes in a frame,
a second primary synchronization symbol transmitted in a second symbol position on a second slice of the plurality of the slices,
an Sth primary synchronization symbol transmitted in an Sth symbol position on as Sth slice of the plurality of the slices.

21. The method according to claim 20, wherein the sequence of primary synchronization symbols includes, in a (k+1)th subframe following the kth subframe,
the second primary synchronization symbol transmitted in the first symbol position on the second slice,
the Sth primary synchronization symbol transmitted in the (S−1)th symbol position on the Sth slice,
the first primary synchronization symbol transmitted in the Sth symbol position on the first slice, and
the second primary synchronization symbol transmitted in the (S+1)th symbol position on the second slice.

22. The method according to claim 17, wherein a first sequence of the primary synchronization symbols is transmitted within a predetermined slot of a first subframe and a second sequence of the primary synchronization symbols is transmitted within a predetermined slot of a second subframe following the first subframe.

23. The method according to claim 17, wherein secondary synchronization symbols and broadcast channel symbols are transmitted during a single predetermined slot following the primary synchronization symbols.

24. The method according to claim 17, wherein a single predetermined slot contains five consecutive primary synchronization symbols.

25. The method according to claim 24, wherein the single predetermined slot contains two secondary synchronization symbols and four broadcast channel symbols following the five consecutive primary synchronization symbols.

26. The method according to claim 25, wherein the secondary synchronization symbols are separated from the five consecutive primary synchronization symbols by one or more symbols.

27. The method according to claim 25, wherein the secondary synchronization symbols and broadcast channel symbols are transmitted on a same slice as a last symbol of the sequence of primary synchronization symbols.

28. The method according to claim 17, wherein secondary synchronization symbols are transmitted in more than one of the plurality of slices following the primary synchronization symbols in a predetermined slot in the subframe.

29. The method according to claim 17, wherein a subframe number for the subframe is related to an order of the primary synchronization symbols in the subframe.

30. The method according to claim 17, wherein the sequence of primary synchronization symbols includes a first group of Q primary synchronization symbols concurrently transmitted on Q different slices of the plurality of slices, where Q is less than or equal to the smallest of a number of radio frequency (RF) chains and a number of the plurality of slices, using a plurality of Q RF chains.

31. The method according to claim 17, further comprising:
- using R radio frequency (RF) chains to transmit R concurrent primary synchronization symbols on R of the slices, wherein the R slices are selected based at least in part on inter-slice interference.

32. The method according to claim 17, further comprising:
- transmitting to a mobile station a number of radio frequency (RF) chains used for synchronization channel transmission.

\* \* \* \* \*